US011496264B2

(12) United States Patent
Akkarakaran et al.

(10) Patent No.: US 11,496,264 B2
(45) Date of Patent: Nov. 8, 2022

(54) INTERACTION OF POSITIONING AND MEDIA ACCESS CONTROL PROCEDURES

(71) Applicant: QUALCOMM Incorporated, San Diego, CA (US)

(72) Inventors: Sony Akkarakaran, Poway, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/787,606

(22) Filed: Feb. 11, 2020

(65) Prior Publication Data

US 2020/0266942 A1    Aug. 20, 2020

Related U.S. Application Data

(60) Provisional application No. 62/806,692, filed on Feb. 15, 2019.

(51) Int. Cl.
*H04W 72/04*    (2009.01)
*H04L 5/00*    (2006.01)
(Continued)

(52) U.S. Cl.
CPC .............. *H04L 5/005* (2013.01); *H04L 5/001* (2013.01); *H04L 5/0082* (2013.01);
(Continued)

(58) Field of Classification Search
CPC ......................... H04W 72/0453; H04W 74/02
See application file for complete search history.

(56) References Cited

U.S. PATENT DOCUMENTS 8,315,646 B2    11/2012    Karjalainen
8,417,260 B2    4/2013    Campos et al.
(Continued)

FOREIGN PATENT DOCUMENTS

GB           2445273 A    7/2008
WO    WO-2018190972 A1    10/2018

OTHER PUBLICATIONS

International Search Report and Written Opinion—PCT/US2020/017853—ISA/EPO—dated Aug. 14, 2020 (191480WO).
(Continued)

*Primary Examiner* — Brandon M Renner
(74) *Attorney, Agent, or Firm* — Qualcomm Incorporated

(57) ABSTRACT

Methods, systems, and devices for wireless communications are described. A user equipment (UE) may determine its position based on one or more position reference signals (PRSs), which the UE receives via different component carriers (CCs). The UE may maintain an active state with a first CC transmitting a PRS, while activating and deactivating a secondary CC that may transmit PRSs based on a periodic interval. Additionally, the UE may apply similar techniques for inactive BWPs where a PRS spans multiple BWPs. In some implementations, the position of the UE may enhance a UE mobility procedure based on determining a resource to use for the UE mobility procedure that is dependent upon the position of the UE. For example, the UE mobility procedure may include a random access procedure or a handover procedure. Additionally, the resources used for the mobility procedures may be quasi co-located with PRSs.

34 Claims, 14 Drawing Sheets

(51) Int. Cl.
*H04W 36/08* (2009.01)
*H04W 8/08* (2009.01)
*H04W 56/00* (2009.01)
*H04W 74/08* (2009.01)
*H04W 74/02* (2009.01)

(52) U.S. Cl.
CPC .......... *H04L 5/0092* (2013.01); *H04L 5/0096* (2013.01); *H04W 8/08* (2013.01); *H04W 36/08* (2013.01); *H04W 56/001* (2013.01); *H04W 72/0453* (2013.01); *H04W 74/02* (2013.01); *H04W 74/0833* (2013.01)

(56) References Cited

U.S. PATENT DOCUMENTS

| | | | |
|---|---|---|---|
| 10,178,497 | B2 | 1/2019 | Unger et al. |
| 2013/0215849 | A1* | 8/2013 | Heo .................. H04W 52/365 370/329 |
| 2013/0294401 | A1* | 11/2013 | Yoon .................. G01S 5/0215 370/329 |
| 2016/0050534 | A1 | 2/2016 | Lim et al. |
| 2016/0353403 | A1 | 12/2016 | Liu |
| 2018/0007707 | A1* | 1/2018 | Rico Alvarino ...... H04L 5/0096 |
| 2019/0052432 | A1* | 2/2019 | Islam .................. H04L 5/0094 |
| 2019/0132824 | A1* | 5/2019 | Jeon .................... H04L 5/0092 |
| 2019/0357262 | A1* | 11/2019 | Cirik .................... H04W 74/02 |
| 2020/0274750 | A1* | 8/2020 | Yi ....................... H04J 11/0073 |
| 2021/0058218 | A1* | 2/2021 | Harada ................ H04L 5/001 |
| 2021/0105783 | A1* | 4/2021 | Wang .................. H04W 72/042 |
| 2021/0227568 | A1* | 7/2021 | Harada ................ H04L 5/0048 |

OTHER PUBLICATIONS

Ericsson et al., Measurement Requirements in RRC Connected State, 3GPP Draft, 3GPP TSG-RAN WG4 Meeting #78, 36133 CR3366R1 (REL-13) R4-161225, 3rd Generation Partnership Project (3GPP), Mobile Competence Centre, 650, Route Des Lucioles, F-06921 Sophia-Antipolis Cedex, France, vol. RAN WG4, No. Malta, MT, Feb. 15, 2016-Feb. 19, 2016 Mar. 6, 2016 (Mar. 6, 2016), XP051075712, 88 Pages, Retrieved from the Internet: URL:http://www.3gpp.org/ftp/Meetings_3GPP_SYNC/RAN/Docs/ [retrieved on Mar. 6, 2016] paragraph [8.1.2.5]—paragraph [8 .1. 2. 6. 4 .1].
Nokia et al., "Idle and Inactive mode positioning for NR", 3GPP Draft, 3GPP TSG RAN WG1 Meeting #AH-1901, R1-1901027 Idle and Inactive, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019 Jan. 20, 2019 (Jan. 20, 2019), XP051593872, 3 Pages, Retrieved from the Internet: URL:http://www.3gpp.org/ftp/Meetings%5F3GPP%5FSYNC/RAN1/Docs/R1%2D1901027%2Ezip [retrieved on Jan. 20, 2019] paragraph [0002]-paragraph [0003].
Partial International Search Report—PCT/US2020/017853—ISA/EPO—dated Jun. 25, 2020 (191480WO).
Qualcomm Incorporated: "TDD Uplink-Downlink Configuration for OTDOA", 3GPP Draft, 3GPP TSG-RAN WG2 Meeting #103bis, R2-1814874 (OTDOA TDD Config), 3rd Generation Partnership Project (3GPP), Mobile Competence Centre, 650, Route Des Lucioles, F-06921 Sophia-Antipolis Cedex, France, vol. RAN WG2, No. Chengdu, CN, Oct. 8, 2018-Oct. 12, 2018 Sep. 27, 2018 (Sep. 27, 2018), XP051524254, pp. 1-3, Retrieved from the Internet: URL:http://www.3gpp.org/ftp/tsg%5Fran/WG2%5FRL2/TSGR2%5F103bis/Docs/R2%2D1814874%2Ezip [retrieved on Sep. 27, 2018] paragraph [0001]- paragraph [0002].

* cited by examiner

INTERACTION OF POSITIONING AND MEDIA ACCESS CONTROL PROCEDURES

CROSS REFERENCE

The present Application for Patent claims the benefit of U.S. Provisional Patent Application No. 62/806,692 by AKKARAKARAN et al., entitled "INTERACTION OF POSITIONING AND MEDIA ACCESS CONTROL PROCEDURES," filed Feb. 15, 2019, assigned to the assignee hereof, and expressly incorporated herein.

BACKGROUND

The following relates generally to wireless communications, and more specifically to interaction of positioning and media access control (MAC) procedures.

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). Additionally, a wireless communications network may implement techniques to keep track of the position of a UE in the wireless communications network. In some implementations, the UE may transmit or receive one or more positioning reference signals (PRSs) to or from base stations, which the network (e.g., the base stations) may use to determine the position of the UE. Additionally or alternatively, the UE may refrain from monitoring for one or more PRSs based on being in a deactivated state for a particular cell, which can hinder the network determining the position of the UE.

SUMMARY

The described techniques relate to improved methods, systems, devices, and apparatuses that support interaction of positioning and media access control (MAC) procedures. Generally, the described techniques may provide for determining a position of a user equipment (UE) based on one or more position reference signals (PRSs). In some implementations, the UE may communicate on a first set of frequency resources in an active state for the UE and refrain from communicating on a second set of frequency resources in an inactive state for the UE. Additionally, the UE may identify a periodic interval for receiving one or more PRSs during a first time window corresponding to the active state and during a second time window corresponding to the inactive state. The UE may then receive a first PRS on the first set of frequency resources and a second PRS on the second set of resources (that is, on an active set of resources and on an inactive set of resources). The UE may then determine its position based on the first PRS and the second PRS. In some implementations, the first set of resources may be a first component carrier (CC), and the second set of resources may be a second CC. Additionally or alternatively, the first set of resources may be a first bandwidth part (BWP), and the second set of resources may be a second BWP. In some examples, the UE may maintain an inactive timer for the second set of resources despite receiving the second PRS on the second set of resources.

Additionally or alternatively, the described techniques may provide for a UE to perform a UE mobility procedure based on determining a geographic position for the UE. In some implementations, the UE may receive one or more PRSs from one or more cells and determine its geographic position based on the received PRSs. Based on the determined geographic position, the UE may then determine a resource to use for the UE mobility procedure and may perform the UE mobility procedure to establish a connection with a cell using the determined resource. In some implementations, the UE may determine the resource to use for the UE mobility procedure based on a history of previously used resources, a relationship between a set of geographic positions and a set of cells, a number of remote radio heads (RRHs) associated with each cell of the set of cells, a relationship between the set of geographic positions and a set of beams, or a combination thereof. In some implementations, an RRH associated with each cell may be referred to as a transmission/reception point (TRP) associated with the respective cell. Additionally, the UE may determine a timing advance (TA) value based on its geographic location and geographic locations of nearby base stations. In some implementations, the UE mobility procedure may include a random access channel (RACH) procedure or a handover procedure. The PRSs may be or may include beam failure detection (BFD) reference signals (BFD-RSs), channel state information (CSI) reference signals (CSI-RSs), dedicated PRSs, a combination of these, or other reference signals transmitted and measured to determine distances between the UE and other wireless devices such as base stations and, thus, to determine a position of the UE.

A method of wireless communication at a UE is described. The method may include communicating on a plurality of sets of frequency resources that are in an active state for the UE; identifying a periodic interval to receive PRSs on the plurality of sets of frequency resources, the periodic interval including a first time window for receiving the PRSs during the active state of the plurality of sets of frequency resources for the UE and a second time window for an inactive state of the plurality of sets of frequency resources for the UE; receiving, during the first time window of the periodic interval, a first PRS on a first set of frequency resources of the plurality of sets of frequency resources and a second PRS on a second set of frequency resources of the plurality of sets of frequency resources; and determining a position of the UE based on the received first PRS and the received second PRS.

An apparatus for wireless communication at a UE is described. The apparatus may include a processor, memory in electronic communication with the processor, and instructions stored in the memory. The instructions may be executable by the processor to cause the apparatus to communicate on a plurality of sets of frequency resources that are in an active state for the UE; identify a periodic interval to receive PRSs on the plurality of sets of frequency resources, the periodic interval including a first time window for receiving the PRS during the active state of the plurality of sets of frequency resources for the UE and a second time window for an inactive state of the plurality of sets of frequency resources for the UE; receive, during the first time window of the periodic interval, a first PRS on a first set of frequency resources of the plurality of sets of frequency resources and a second PRS on a second set of frequency resources of the plurality of sets of frequency resources; and determine a position of the UE based on the received first PRS and the received second PRS.

Another apparatus for wireless communication at a UE is described. The apparatus may include means for communicating on a plurality of sets of frequency resources that are in an active state for the UE; identifying a periodic interval to receive PRSs on the plurality of sets of frequency resources, the periodic interval including a first time window for receiving the PRS during the active state of the plurality of sets of frequency resources for the UE and a second time window for an inactive state of the plurality of sets of frequency resources for the UE; receiving, during the first time window of the periodic interval, a first PRS on a first set of frequency resources of the plurality of sets of frequency resources and a second PRS on a second set of frequency resources of the plurality of sets of frequency resources; and determining a position of the UE based on the received first PRS and the received second PRS.

A non-transitory computer-readable medium storing code for wireless communication at a UE is described. The code may include instructions executable by a processor to communicate on a plurality of sets of frequency resources that are in an active state for the UE; identify a periodic interval to receive PRSs on the plurality of sets of frequency resources, the periodic interval including a first time window for receiving the PRS during the active state of the plurality of sets of frequency resources for the UE and a second time window for an inactive state of the plurality of sets of frequency resources for the UE; receive, during the first time window of the periodic interval, a first PRS on a first set of frequency resources of the plurality of sets of frequency resources and a second PRS on a second set of frequency resources of the plurality of sets of frequency resources; and determine a position of the UE based on the received first PRS and the received second PRS.

Some examples of the method, apparatuses, and non-transitory computer-readable medium described herein may further include operations, features, means, or instructions for receiving a configuration indicating the periodic interval, where the periodic interval may be identified based on the received configuration.

In some examples of the method, apparatuses, and non-transitory computer-readable medium described herein, receiving the configuration may include operations, features, means, or instructions for receiving radio resource control (RRC) signaling that indicates the configuration.

Some examples of the method, apparatuses, and non-transitory computer-readable medium described herein may further include operations, features, means, or instructions for receiving, on the second set of frequency resources, control channel signaling during the first time window.

In some examples of the method, apparatuses, and non-transitory computer-readable medium described herein, the second PRS and the control channel signaling may be received during a same set of one or more symbol periods.

In some examples of the method, apparatuses, and non-transitory computer-readable medium described herein, the second PRS may be received in a first set of one or more symbol periods, and the control channel signaling may be received in a second set of one or more symbol periods adjacent to the first set of one or more symbol periods.

In some examples of the method, apparatuses, and non-transitory computer-readable medium described herein, communicating on the plurality of sets of frequency resources may include operations, features, means, or instructions for communicating on the first set of frequency resources based on a configuration that includes the first set of frequency resources and excludes the second set of frequency resources.

In some examples of the method, apparatuses, and non-transitory computer-readable medium described herein, the first set of frequency resources may include a first CC, the plurality of sets of frequency resources may include one or more CCs different from the first CC, and the second set of frequency resources may include a second CC of the one or more CCs.

In some examples of the method, apparatuses, and non-transitory computer-readable medium described herein, the first set of frequency resources may include a first BWP, the plurality of sets of frequency resources may include one or more BWPs different from the first BWP, and the second set of frequency resources may include a second BWP of the one or more BWPs.

Some examples of the method, apparatuses, and non-transitory computer-readable medium described herein may further include operations, features, means, or instructions for maintaining an inactivity timer indicating an inactive state of the second set of frequency resources for the UE during the second time window while communicating on the first set of frequency resources that is in the active state for the UE during the second time window.

In some examples of the method, apparatuses, and non-transitory computer-readable medium described herein, receiving the first PRS and the second PRS may include operations, features, means, or instructions for receiving, during the first time window of the periodic interval, the first PRS from a first base station on the first set of frequency resources and the second PRS from a second base station on the second set of frequency resources.

In some examples of the method, apparatuses, and non-transitory computer-readable medium described herein, receiving the first PRS and the second PRS may include operations, features, means, or instructions for receiving, during the first time window of the periodic interval, the first PRS from a base station on the first set of frequency resources and the second PRS from the base station on the second set of frequency resources.

A method of wireless communication at a UE is described. The method may include receiving a set of PRSs from a set of cells; determining a geographic position of the UE based on the received set of PRSs; determining, based on the determined geographic position of the UE, a resource for a UE mobility procedure associated with a selected cell; and performing, using the determined resource, the UE mobility procedure to establish a connection with the selected cell.

An apparatus for wireless communication at a UE is described. The apparatus may include a processor, memory in electronic communication with the processor, and instructions stored in the memory. The instructions may be executable by the processor to cause the apparatus to receive a set of PRSs from a set of cells; determine a geographic position of the UE based on the received set of PRSs; determine, based on the determined geographic position of the UE, a resource for a UE mobility procedure associated with a selected cell; and perform, using the determined resource, the UE mobility procedure to establish a connection with the selected cell.

Another apparatus for wireless communication at a UE is described. The apparatus may include means for receiving a set of PRSs from a set of cells; determining a geographic position of the UE based on the received set of PRSs; determining, based on the determined geographic position of the UE, a resource for a UE mobility procedure associated with a selected cell; and performing, using the determined resource, the UE mobility procedure to establish a connection with the selected cell.

A non-transitory computer-readable medium storing code for wireless communication at a UE is described. The code may include instructions executable by a processor to receive a set of PRSs from a set of cells; determine a geographic position of the UE based on the received set of PRSs; determine, based on the determined geographic position of the UE, a resource for a UE mobility procedure associated with a selected cell; and perform, using the determined resource, the UE mobility procedure to establish a connection with the selected cell.

Some examples of the method, apparatuses, and non-transitory computer-readable medium described herein may further include operations, features, means, or instructions for determining that the determined resource was previously identified for the UE mobility procedure at the determined geographic position, the selected cell based on the determination that the determined resource was previously identified.

In some examples of the method, apparatuses, and non-transitory computer-readable medium described herein, determining the resource for the UE mobility procedure may include operations, features, means, or instructions for receiving information that identifies a set of geographic positions and a set of cells and that indicates a relationship between the set of geographic positions and the set of cells; selecting the cell based on the received information and the determined geographic position of the UE; and determining, for the UE mobility procedure, the resource corresponding to the selected cell.

In some examples of the method, apparatuses, and non-transitory computer-readable medium described herein, selecting the cell may further include operations, features, means, or instructions for identifying a strongest beam of a set of beams and selecting the cell based on the received information, the determined geographic position of the UE, and the identified strongest beam.

In some examples of the method, apparatuses, and non-transitory computer-readable medium described herein, selecting the cell further may include operations, features, means, or instructions for identifying, based on the received information and the determined geographic position, a first candidate cell of the set of cells and a second candidate cell of the set of cells and selecting the first candidate cell as the cell based on determining that the first candidate cell includes one or more RRHs.

Some examples of the method, apparatuses, and non-transitory computer-readable medium described herein may further include operations, features, means, or instructions for receiving system information indicating that the first candidate cell includes the one or more RRHs, where the system information is received from the first candidate cell or a current serving cell of UE 115-d.

Some examples of the method, apparatuses, and non-transitory computer-readable medium described herein may further include operations, features, means, or instructions for identifying information stored at the UE indicating that the first candidate cell includes the one or more RRHs, the information stored at the UE during a time period before the receiving the set of PRSs, the UE wirelessly connected to the first candidate cell during at least a portion of the time period.

Some examples of the method, apparatuses, and non-transitory computer-readable medium described herein may further include operations, features, means, or instructions for determining a position of the UE relative to the one or more RRHs of the first candidate cell and selecting the first candidate cell as the cell based on determining that the first candidate cell includes the one or more RRHs and the determined geographic position of the UE relative to the one or more RRHs.

In some examples of the method, apparatuses, and non-transitory computer-readable medium described herein, determining the resource for the UE mobility procedure may include operations, features, means, or instructions for receiving information that identifies a set of geographic positions and a set of beams and that indicates a relationship between the set of geographic positions and the set of beams; selecting a synchronization signal block (SSB) based on the received information and the determined geographic position of the UE; and determining, for the UE mobility procedure, the resource corresponding to the selected SSB.

Some examples of the method, apparatuses, and non-transitory computer-readable medium described herein may further include operations, features, means, or instructions for identifying, for each base station of a set of base stations associated with the set of cells, a geographic position of the base station and determining, based on the geographic position of the UE and the identified geographic positions of the set of base stations, a TA value for the UE to use to perform the UE mobility procedure to establish the connection with the cell, the cell served by a first base station of the set of base stations.

In some examples of the method, apparatuses, and non-transitory computer-readable medium described herein, the TA value may be determined prior to the UE receiving a TA command from the selected cell.

In some examples of the method, apparatuses, and non-transitory computer-readable medium described herein, performing the UE mobility procedure may include operations, features, means, or instructions for transmitting, to the selected cell, a first message of a random access procedure based on the determined TA value.

Some examples of the method, apparatuses, and non-transitory computer-readable medium described herein may further include operations, features, means, or instructions for receiving an indication that the determined resource for the UE mobility procedure may be quasi co-located (QCLed) with a PRS.

In some examples of the method, apparatuses, and non-transitory computer-readable medium described herein, receiving the indication may include operations, features, means, or instructions for receiving RRC signaling including the indication, where the UE mobility procedure includes a contention-free random access (CFRA) procedure.

In some examples of the method, apparatuses, and non-transitory computer-readable medium described herein, receiving the indication may include operations, features, means, or instructions for receiving system information including the indication, where the system information configures PRSs, and the UE mobility procedure includes a contention-based random access (CBRA) procedure.

In some examples of the method, apparatuses, and non-transitory computer-readable medium described herein, performing the UE mobility procedure may include operations, features, means, or instructions for performing a random access procedure with the selected cell.

In some examples of the method, apparatuses, and non-transitory computer-readable medium described herein, performing the UE mobility procedure may include operations, features, means, or instructions for performing a handover procedure from a source cell to the selected cell.

In some examples of the method, apparatuses, and non-transitory computer-readable medium described herein, the set of PRSs include a set of BFD-RSs, or a set of CSI-RSs, or a set of dedicated PRSs, or a combination thereof.

In some examples of the method, apparatuses, and non-transitory computer-readable medium described herein, the set of PRSs may be QCLed with a set of BFD-RSs, or a set of CSI-RSs, or a combination thereof.

DETAILED DESCRIPTION

Figure 1:
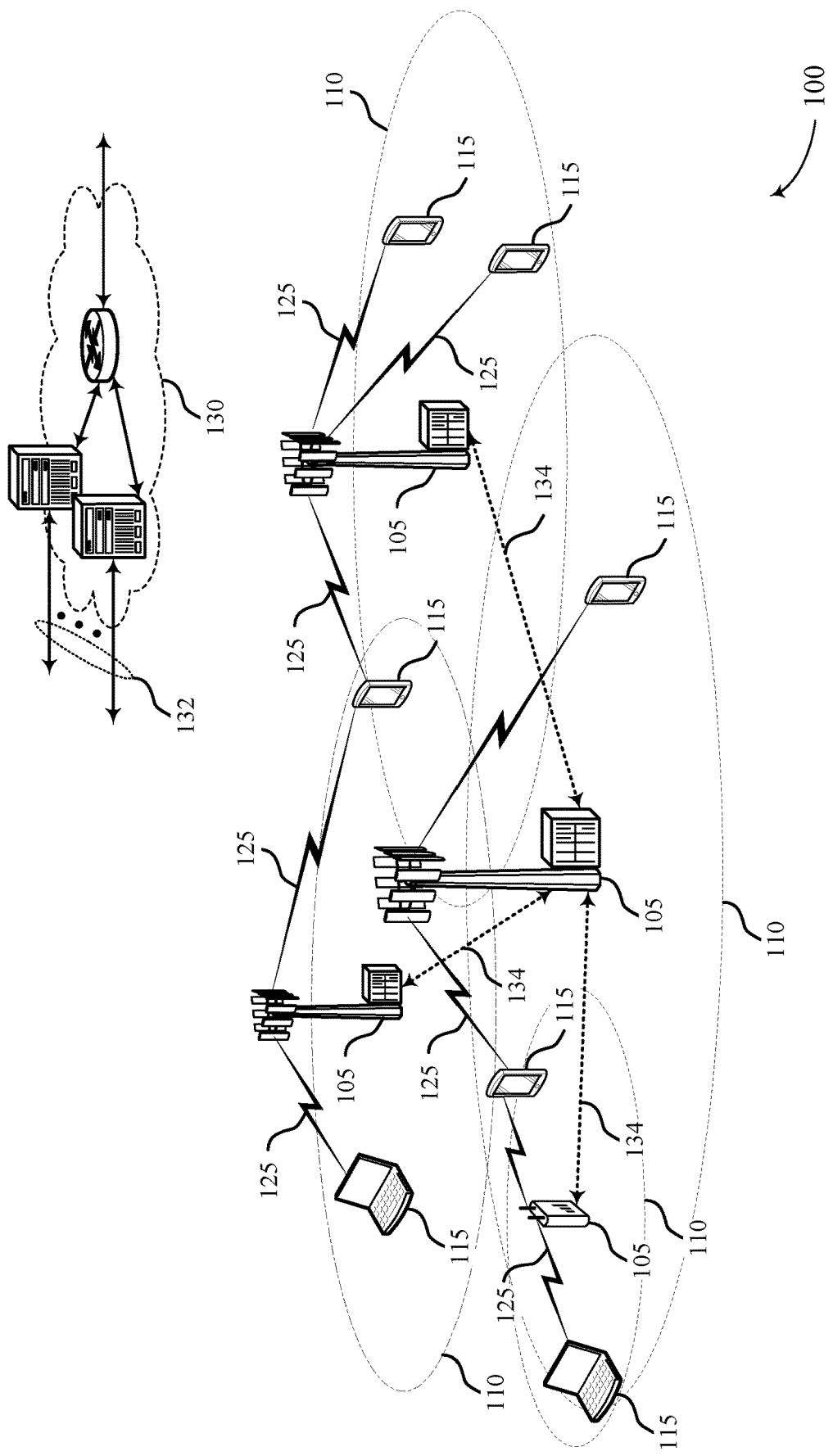
FIG. 1 illustrates an example of a wireless communications system that supports an interaction of positioning and media access control (MAC) procedures in accordance with aspects of the present disclosure.

A serving base station of a user equipment (UE) may keep track of the location or position of the UE. Various positioning techniques may be used to track the UE. In some examples, the UE may be configured to transmit one or more uplink positioning reference signals (PRSs) to the serving base station and one or more neighboring base stations, or the UE may be configured to receive one or more downlink PRSs from the serving base station and one or more neighboring base stations. In some implementations, an uplink PRS, or downlink PRS, or both, may be transmitted on a channel defined exclusively for positioning purposes or may be transmitted on a channel or signal utilized for separate signaling (such as synchronization signals, channel-state information reference signals (CSI-RSs), sounding reference signal (SRSs)), which may also be used for determining a position of the UE. For an uplink PRS, the base station and the neighboring base stations may exchange, for example via backhaul links, information associated with the receipt of the uplink PRSs, such as reference signal time difference (RSTD) measurements. The network (including the base stations) may then determine the location of the UE based on the one or more uplink PRS transmissions.

For downlink PRS transmissions, the UE may receive a PRS from each of one or more base stations. In some examples, UE may estimate its position based on measurements, such as RSTD measurements performed by the UE on the downlink PRS transmissions. Additionally, or alternatively, the UE may transmit measurement reports for the one or more downlink PRSs to a serving base station. Generally, a positioning technique may be UE-based or UE-assisted. In UE-based positioning, the UE may perform the position estimation without feeding back RSTD measurements to the network (for example, via a base station). In UE-assisted positioning, the UE may provide the RSTD measurements to the network (for example, via the base station), and the network may perform the positioning estimation using the RSTD measurements. A UE may be configured for a UE-based mode, a UE-assisted mode, or a mode which incorporates aspects of both. The positioning mode may be selected based on a connection initialization configuration, downlink control information (DCI), or a media access control (MAC) control element (CE).

In some examples, the UE may communicate with one or more base stations on one or more cells simultaneously, where PRSs are transmitted or received with each cell. For example, the UE may simultaneously communicate (such as transmitting and receiving PRSs) with multiple cells associated with a single base station or with multiple cells associated with different base stations. When not communicating with one of the cells, the UE may enter an inactive state with respect to that cell. In some implementations, the UE may determine to enter the inactive state based on a periodic interval (for example, a time interval that occurs periodically as indicated by a configuration for the UE) or a length of inactivity with the cell, for example, after not transmitting or receiving a signal to or from the cell, respectively. While in the inactive state, the UE may refrain from monitoring for a PRS from the cell or from transmitting a PRS to the cell. As such, the serving cell for the UE may determine the position of the UE based on a limited number of PRS transmissions and receptions, leading to an inefficient procedure and less accurate position determination. Additionally, mobility procedures that benefit from knowing the position of the UE may be adversely affected based on the limited number of PRS transmissions and receptions.

As described herein, a UE may monitor for one or more PRSs spanning multiple frequency resources (for example, multiple component carriers (CCs), multiple bandwidth parts (BWPs), or other multiple units of frequency resources) even when one or more of the frequency resources is otherwise deactivated. For example, the UE may enter into an inactive state with respect to a cell, as described above, where frequency resources, such as CCs or BWPs, configured for communicating with that cell are then deactivated for the UE (for example, based on the periodic interval). However, the UE may activate the CC or BWP for a first duration, the first duration corresponding to a duration of the PRS. In some implementations, the UE may determine the duration of the PRS based on the periodic interval configured for the UE to monitor for any PRSs from the cell. Additionally, the UE may not reset an inactivity timer for the cell (for example, for releasing a context of the cell) based on activating the CC or BWP and monitoring for or receiving the PRS. That is, the UE may not treat the PRS monitoring or reception as a sign of activity. In some implementations, the cell may be a secondary cell (SCell) of a dual connectivity (DC) configuration or of a carrier aggregation (CA) configuration. Additionally, the techniques described herein may apply to bandwidth part (BWP) inactivity timers for PRSs spanning multiple BWPs.

After determining the position of the UE, different mobility procedures for the UE may be enhanced based on the position of the UE. In some implementations, the UE may perform the different mobility procedures over a MAC layer of the UE. For example, the different mobility procedures may include a random access channel (RACH) procedure, a handover procedure, or a similar procedure that enables the UE to connect to a base station or cell. The UE (and the network) may determine the position prior to performing the mobility procedures based on radio access technology (RAT)-independent means, from previous RAT-dependent position fixes, or from additional means (such as monitoring deactivated CCs or BWPs for PRSs as described above). The UE may then use prior knowledge of cells in conjunction with the determined current position to determine a resource for the mobility procedures. In some implementations, a current position of the UE may include a current orientation of the device, which may be determined as part of current position determination, by other means (such as orientation sensors), or by a combination of the two processes. Additionally or alternatively, the UE may estimate a timing advance (TA) correction based on the determined current position (or location) and positions of one or more base stations with which the UE is communicating. In some implementations, resources used for the mobility procedures (for example, RACH resources, beam failure detection (BFD) reference signals (BFD-RSs), or channel state information (CSI) reference signal (CSI-RSs) for radio resource management (RRM)) may be quasi co-located (QCLed) with PRSs.

Aspects of the disclosure are initially described in the context of a wireless communications system. Additionally, aspects of the disclosure are described with respect to a UE mobility procedure, a multi-cell positioning procedure, and examples of process flows. Aspects of the disclosure are further illustrated by and described with reference to apparatus diagrams, system diagrams, and flowcharts that relate to interaction of positioning and MAC procedures.

FIG. 1 illustrates an example of a wireless communications system 100 that supports interaction of positioning and MAC procedures in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some implementations, wireless communications system 100 may support enhanced broadband communications, ultra-reliable (for example, mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (for example, macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some implementations, the term "cell" may refer to a portion of a geographic coverage area 110 (for example, a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (for example, according to narrowband communications). In some implementations, UEs 115 may be designed to support critical functions (for example, mission critical functions), and a wireless communications system 100 may be configured to provide ultra-reliable communications for these functions.

In some implementations, a UE 115 may also be able to communicate directly with other UEs 115 (for example, using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some implementations, groups of UEs 115 communicating via D2D communications may utilize a one-to-many (1:M) system in which each UE 115 transmits to every other UE 115 in the group. In some implementations, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (for example, via an S1, N2, N3, or other interface). Base stations 105 may communicate with one another over backhaul links 134 (for example, via an X2, Xn, or other interface) either directly (for example, directly between base stations 105) or indirectly (for example, via core network 130).

The core network 130 may provide user authentication, access authorization, tracking, Internet Protocol (IP) connectivity, and other access, routing, or mobility functions.

The core network 130 may be an evolved packet core (EPC), which may include at least one mobility management entity (MME), at least one serving gateway (S-GW), and at least one Packet Data Network (PDN) gateway (P-GW). The MME may manage non-access stratum (for example, control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (for example, radio heads and access network controllers) or consolidated into a single network device (for example, a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, because the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (for example, less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (for example, from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some implementations, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some implementations, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some implementations, operations in unlicensed bands may be based on a carrier aggregation configuration in conjunction with component carriers operating in a licensed band (for example, LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (for example, a base station 105) and a receiving device (for example, a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (for example, the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (for example, a base station 105 or a UE 115) to shape or steer an antenna beam (for example, a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying particular amplitude and phase offsets to signals carried via each of the antenna elements associated with the device. The adjustments associated with each of the antenna elements may be defined by a beamforming weight set associated with a particular orientation (for example, with respect to the antenna array of the transmitting device or receiving device, or with respect to some other orientation).

In one example, a base station 105 may use multiple antennas or antenna arrays to conduct beamforming operations for directional communications with a UE 115. For instance, some signals (for example, synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (for example, by the base station 105 or a receiving device, such as a UE 115) a beam direction for subsequent transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115), or transmitting a signal in a single direction (for example, for transmitting data to a receiving device).

A receiving device (for example, a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (for example, when receiving a data signal). The single receive beam may be aligned in a beam direction determined based at least in part on listening according to different receive beam directions (for example, a beam direction determined to have a highest signal strength, highest signal-to-noise ratio, or otherwise acceptable signal quality based at least in part on listening according to multiple beam directions).

In some implementations, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some implementations, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some implementations, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some implementations, UEs 115 and base stations 105 may support retransmissions of data to increase the likelihood that data is received successfully. HARQ feedback is one technique of increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, signal-to-noise conditions). In some implementations, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (for example, depending on the length of the cyclic prefix prepended to each symbol period). Excluding the cyclic prefix, each symbol period may contain 2048 sampling periods. In some implementations, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (for example, in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (for example, an evolved universal mobile telecommunication system terrestrial radio access (E-UTRA) absolute radio frequency channel number (EARFCN)), and may be positioned according to a channel raster for discovery by UEs 115. Carriers may be downlink or uplink (for example, in an FDD mode), or be configured to carry downlink and uplink communications (for example, in a TDD mode). In some examples, signal waveforms transmitted over a carrier may be made up of multiple sub-carriers (for example, using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (for example, LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (for example, synchronization signals or system information) and control signaling that coordinates operation for the carrier. In some examples (for example, in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (for example, between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (for example, 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (for example, set of subcarriers or RBs) within a carrier (for example, "in-band" deployment of a narrowband protocol type).

In a system employing MCM techniques, a resource element may consist of one symbol period (for example, a duration of one modulation symbol) and one subcarrier, where the symbol period and subcarrier spacing are inversely related. The number of bits carried by each resource element may depend on the modulation scheme (for example, the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (for example, spatial layers), and the use of multiple spatial layers may further increase the data rate for communications with a UE 115.

Devices of the wireless communications system 100 (for example, base stations 105 or UEs 115) may have a hardware configuration that supports communications over a particular carrier bandwidth, or may be configurable to support communications over one of a set of carrier bandwidths. In some examples, the wireless communications system 100 may include base stations 105 or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some implementations, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some implementations, an eCC may be associated with a carrier aggregation configuration or a dual connectivity configuration (for example, when multiple serving cells have a suboptimal or non-ideal backhaul link). An eCC may also be configured for use in unlicensed spectrum or shared spectrum (for example, where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (for example, to conserve power).

In some implementations, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (for example, according to frequency channel or carrier bandwidths of 20, 40, 60, 80 MHz) at reduced symbol durations (for example, 16.67 microseconds). A TTI in eCC may consist of one or multiple symbol periods. In some implementations, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (for example, across the frequency domain) and horizontal (for example, across the time domain) sharing of resources.

In some examples, a UE 115 in wireless communications system 100 may communicate with one or more base stations 105. Each base station 105 may provide a cell which extends within a coverage area of the base station 105. The UE 115 may move within the coverage area, and the cell may provide wireless communications (for example, NR communications) to the UE 115. In some implementations, the UE 115 may be allocated a BWP to communicate with a serving base station 105. The BWP may be a contiguous set of physical resource blocks (PRBs) on a given wireless communications carrier. Each BWP may be associated with a numerology, where a subcarrier spacing (SCS), symbol duration, and cyclic prefix length used for the BWP is based on the numerology. The PRBs may be selected from a contiguous subset of common resource blocks, which are allocated or assigned by a base station 105 to served UEs 115. The UE 115 may have one active BWP for uplink transmissions and one active BWP for downlink communications. Generally, the UE 115 may transmit and receive within the frequency ranges of the active BWPs, and the UE 115 may not be configured to transmit or expected to receive transmissions outside of the active BWPs for uplink and downlink communications, respectively. In some implementations, a base station 105 configuring a BWP for the UE 115 may indicate the start of the BWP (for example, in frequency) based on an offset from a common reference point in the carrier. In some examples, the common reference point may correspond to a reference resource block, a start point of the carrier, an end point of the carrier, or a center point of the carrier.

In wireless communications system 100, the network (for example, the UEs 115 and base stations 105) may use downlink and uplink PRSs to determine a position of a UE 115. In some examples, the downlink and uplink PRSs may reuse or may extend existing reference signals (such as synchronization signal blocks (SSBs), CSI-RSs, or sounding reference signals (SRSs)) or may be defined specifically as a separate reference signal (that is, the PRS is defined specifically for determining a location of the UE 115). By defining the PRS as such, the PRS may share similar characteristics with other reference signals. For example, techniques for reusing existing reference signals for PRS purposes may enhance different procedures for the UE 115. In some implementations, it may be desirable to extend existing procedures using existing reference signals to additionally or instead use PRSs to improve upon existing procedures (for example, MAC or RRC procedures).

Wireless communications system 100 may support efficient techniques for determining a position of a UE 115 based on one or more PRSs, which the UE 115 may receive via different CCs. The UE 115 may maintain an active state with a first CC transmitting a PRS, while activating and deactivating a secondary CC that may transmit PRSs based on a periodic interval (for example, a schedule of periodic intervals where a PRS may be transmitted on the secondary CC), where the PRSs span multiple CCs. For example, the UE 115 may be in an inactive state with the secondary CC based on no communications having occurred on the secondary CC or based on a periodic or semi-periodic configuration for activation/deactivation but may activate the secondary CC to monitor for one or more PRSs. However, the UE 115 may not treat activating the secondary CC and receiving a PRS as a sign of activity for reactivating communications on the secondary CC (for example, resetting an inactivity timer). Additionally or alternatively, the UE 115 may apply similar techniques for inactive BWPs where a PRS spans multiple BWPs. In some implementations, the position of the UE 115 may enhance a UE mobility procedure based on determining a resource to use for the UE mobility procedure that is dependent upon the position of the UE 115. For example, the UE mobility procedure may include a RACH procedure or a handover procedure. Additionally, the resources used for the mobility procedures (for example, RACH resources, BFD-RSs, or CSI-RSs for RRM) may be QCLed with the PRSs.

Figure 2:
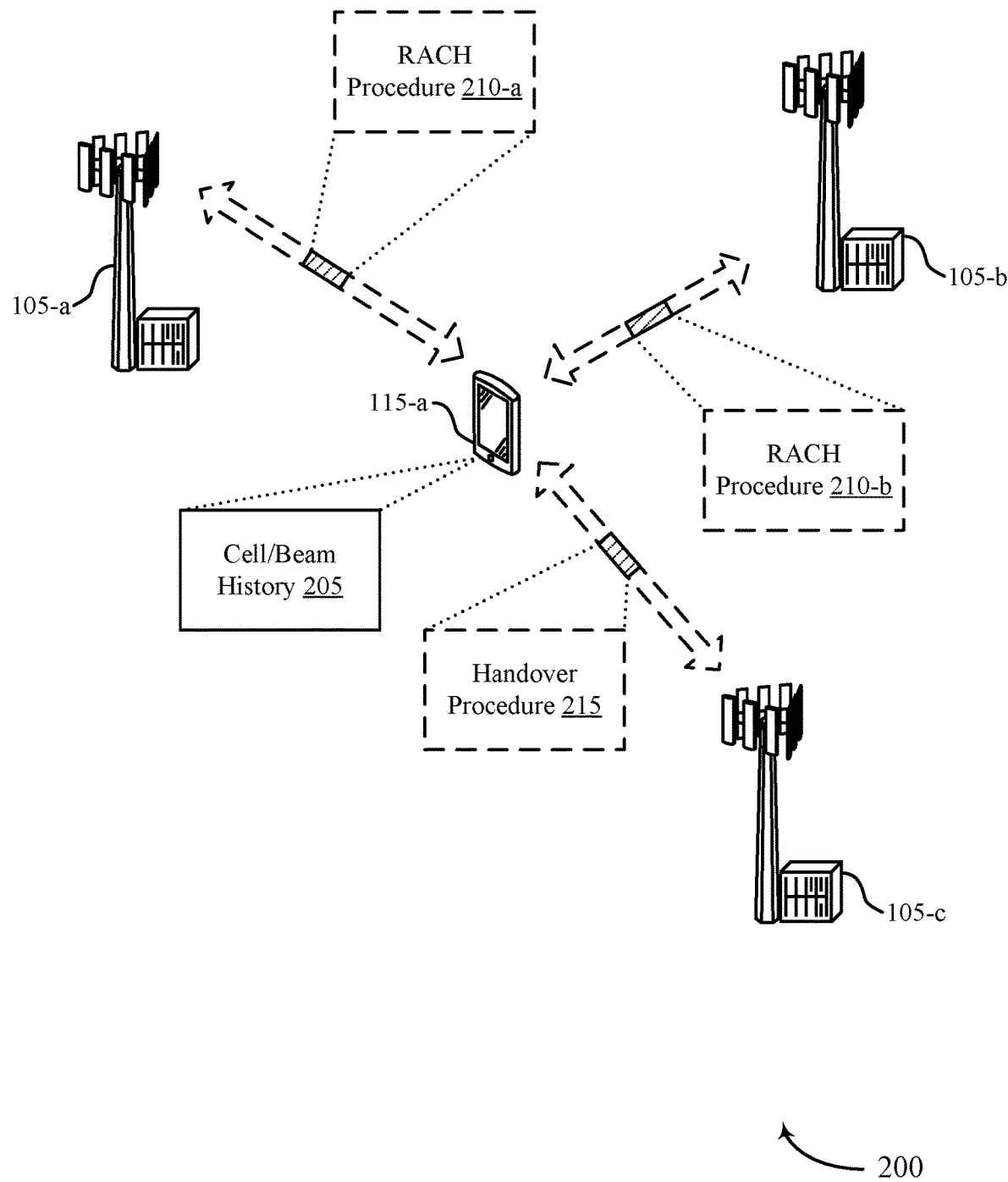
FIG. 2 illustrates an example of a user equipment (UE) mobility procedure that supports an interaction of positioning and MAC procedures in accordance with aspects of the present disclosure.

FIG. 2 illustrates an example of a UE mobility procedure 200 that supports interaction of positioning and MAC procedures in accordance with aspects of the present disclosure. In some examples, UE mobility procedure 200 may implement aspects of wireless communications system 100. UE mobility procedure 200 may include a base station 105-a, a base station 105-b, a base station 105-c, and a UE 115-a, which may be examples of corresponding base stations 105 and UEs 115, respectively, as described with reference to FIG. 1. Base station 105-a may be an example of a serving base station 105 for UE 115-a, while base station 105-b and base station 105-c may be examples of neighboring base stations 105.

As described herein, the base stations 105 and UE 115-a may improve different UE mobility procedures based on knowing a position of UE 115-a. For example, base station 105-a and UE 115-a may determine a current position of UE 115-a based on RAT-independent means (for example, Global Navigation Satellite System (GNSS) or Global Positioning System (GPS)) or based on a previous RAT-dependent positioning fix (for example, condition-based RAT procedures, such as initial access procedure, where a position of UE 115-a may be estimated or known from initial access). In some implementations, the current position determination may include an orientation determination, which may use one or both of the RAT-dependent means (such as the initial access procedure) and the RAT-independent means (such as orientation sensors). UE 115-a may use previous measurements and information to identify previously used cells or beams to use for a UE mobility procedure, where the cells or beams are further identified based on the current position of UE 115-a. For example, UE 115-a may reference a cell/beam history 205 (such as a database or table of previously identified cells and beams and respective cell/beam strengths based on the current position of UE 115-a) to select a cell and an SSB for an associated RACH resource selection for initial access.

As shown, UE 115-a may reference the cell/beam history 205 (for example, the cell/beam strengths indexed based on position) and perform a RACH to connect to a base station 105 via a cell/beam based on a corresponding cell/beam strength with respect to the current position of UE 115-a. The cells/beams may be indexed, for example, based on the current position of UE 115-a. In some implementations, UE 115-a may perform a RACH on cells/beams based on whether a cell/beam strength indicated in the cell/beam history 205 is greater than or equal to a threshold. For example, UE 115-a may determine that a cell or beam associated with base station 105-a is strong based on the current position of UE 115-a and on the cell/beam history 205 and may perform a RACH procedure 210-a for an initial access with base station 105-a. Additionally or alternatively, UE 115-a may determine that a cell or beam associated with base station 105-b is strong based on the current position of UE 115-a and on the cell/beam history 205 and may perform a RACH procedure 210-b for an initial access with base station 105-b. In some implementations, UE 115-a may perform both RACH procedures 210 to improve the chances that at least one initial access procedure is successful with at least one base station 105 or may perform one RACH procedure 210 for initial access based on which beam or cell is stronger based on the cell/beam history 205 with respect to its current position.

Additionally, UE 115-a may also use the cell/beam history 205 complementary with SSB beam strengths for determining a base station 105 or cell with which to perform a RACH procedure 210. For example, UE 115-a may identify the strongest cell or beam and use the identified cell or beam to connect to a corresponding base station 105 (for example, through the RACH procedure 210). Additionally or alternatively, UE 115-a may factor in prior knowledge of cells better suited to providing positioning functionality (for example, cells with remote radio head (RRH) deployment) when identifying a base station 105 for the RACH procedure. For example, UE 115-a may perform a cell-search and identify cells having comparably strong SSBs (for example, the strongest detected SSB of multiple detected SSBs), and UE 115-a may give preference to cells already known to have an RRH deployment (for example, where the strong or strongest SSB was from one of the RRHs) based on a master information block (MIB), based on remaining minimum system information (RMSI), or based on information received previously via a system information block (SIB) or one or more RRC messages when UE 115-a was last connected to the cell. In some implementations, UE 115-a may receive system information about candidate (or potential) cells with which to perform the RACH procedure 210, where the system information is received from the candidate cells themselves (for example, via the MIB or SIB) or from a serving cell of UE 115-a (for example, in a neighbor-cell or candidate-cell list, which may include a cell identification (ID) and other information about the candidate cell(s), such as the number of RRHs).

Additionally or alternatively, UE 115-a may give preference to cells based on previous camping by UE 115-a on a cell at that location. In some implementations, single-cell positioning (for example, lower latency single-cell positioning) may be possible using multiple RRHs. UE 115-a may determine whether the single-cell positioning is possible based on the position of UE 115-a relative to known RRH locations (that is, whether UE 115-a is within a convex hull of the RRH locations of the cell). In some implementations, the RRHs may be referred to as TRPs associated with the cell of the RRH.

Further, as described herein, UE 115-a may estimate a TA correction with respect to the position of UE 115-a and positions of the base stations 105, if known, prior to receiving any TA information from one of the base stations 105. Such TA estimations may improve UE mobility procedures where a TA is unavailable. For example, UE 115-a may incorporate estimated TA values for earlier RACH messages transmitted to a base station 105 of a RACH procedure 210 prior to receiving a TA indication from the base station 105. In some examples, UE 115-a may use this estimated TA for a first message (that is, message A (MsgA)) of a two-step RACH procedure where a TA would be unavailable without the estimated TA. Conventionally, in a four-step RACH procedure, the base station 105 may transmit a TA command in a third message (for example, a msg3 or RRC connection request message). However, the two-step RACH procedure may not contain the third message, where the first message of the two-step RACH procedure combines elements of the third message along with a first message of the four-step RACH procedure (for example, a msg1 or RACH preamble). Accordingly, UE 115-*a* may not have the TA prior to transmitting the first message of the two-step RACH procedure but may estimate the TA to improve chances that the first message is received at the base station 105 at a synchronized time.

In some implementations, resources used for a RACH procedure 210 may be QCLed with PRSs. For example, the RACH resources may be associated with a downlink PRS (rather than a downlink SSB). For a contention free RACH (CFRA) procedure (for example, for a handover or a reconnection), the RACH resources may be RRC configured (for example, after a TA correction in 4-step RACH or in an RRC connected mode). For example, UE 115-*a* may determine which transmit beam to use based on a previous RACH procedure that configures an RRC connection (for example, whether to use the same transmit beam which was used to receive a signal in the previous RACH procedure). Additionally or alternatively, for a contention based RACH (CBRA) procedure (for example, for initial access), the RACH resources associated with (for example, QCLed with) PRS may be indicated in positioning SIBs (Pos-SIBs) used for configuring PRSs for idle-mode positioning.

Additionally, the techniques described above may be applied to additional UE mobility procedures. For example, UE 115-*a* may perform a beam failure recovery (BFR) and handover procedure using the cell/beam history 205 based on the current position of UE 115-*a*. In some examples, BFD-RSs may be PRSs (for example, in addition to SSBs or CSI-RSs) or may be QCLed with PRSs. In some implementations, a BFD-RS may be monitored on downlink communications and subsequently evaluated for a beam failure detection (for example, to ensure beam quality), for positioning, or a combination thereof. In some examples, UE 115-*a* may consider the BFD-RSs when referencing the cell/beam history 205. UE 115-*a* may then decide whether to forward handover to a cell more desirable for positioning (for example, one with RRH deployment) as part of a BFR based on similar considerations outlined for a RACH procedure 210 (for example, based on a current cell). For example, UE 115-*a* may detect a beam failure for communications with a first base station 105 (such as base station 105-*a* or base station 105-*b*) and then perform a handover procedure 215 to initiate access for communicating with base station 105-*c*, where base station 105-*c* is previously identified from the cell/beam history 205 as having strong connection characteristics (such as stronger beams or cells) when UE 115-*a* is at a current/specific position.

Additionally or alternatively, CSI-RSs for RRM may serve as PRSs or may be QCLed with PRSs. In some implementations, a beam training process during a RACH procedure may utilize PRSs. For example, in a four-step RACH procedure, UE 115-*a* may include, within a msg3, an indication of a preferred beam from one or more beams used to transmit a PRS while UE 115-*a* was in an idle mode. In absence of such a PRS during the idle mode, the beam training process may involve one or more transmissions of additional reference signals for the beam training (for example, CSI-RSs) prior to a msg3 transmission (for example, along with a second message (msg2) of the four-step RACH procedure). However, the presence of a PRS being transmitted and monitored for in the idle mode may avoid the need for this overhead (that is, the one or more additional reference signal transmissions).

In some implementations, SSBs may be used as PRSs. In some wireless communications systems (e.g., NR), UE 115-*a* may not consider SSBs outside of an SSB measurement timing configuration (SMTC) occasion when performing RRM measurements. Thus, a separate SMTC occasion may be configured for SSBs being used as PRSs, and UE 115-*a* may use these SSBs for RRM measurements as well. This configuration may be implicitly indicated based on a time-frequency allocation of resources for the SSBs being used as PRSs (for example, outside of the SMTC window). Additionally or alternatively, SSBs being used as PRSs may occur within the configured SMTC window.

Figure 3:
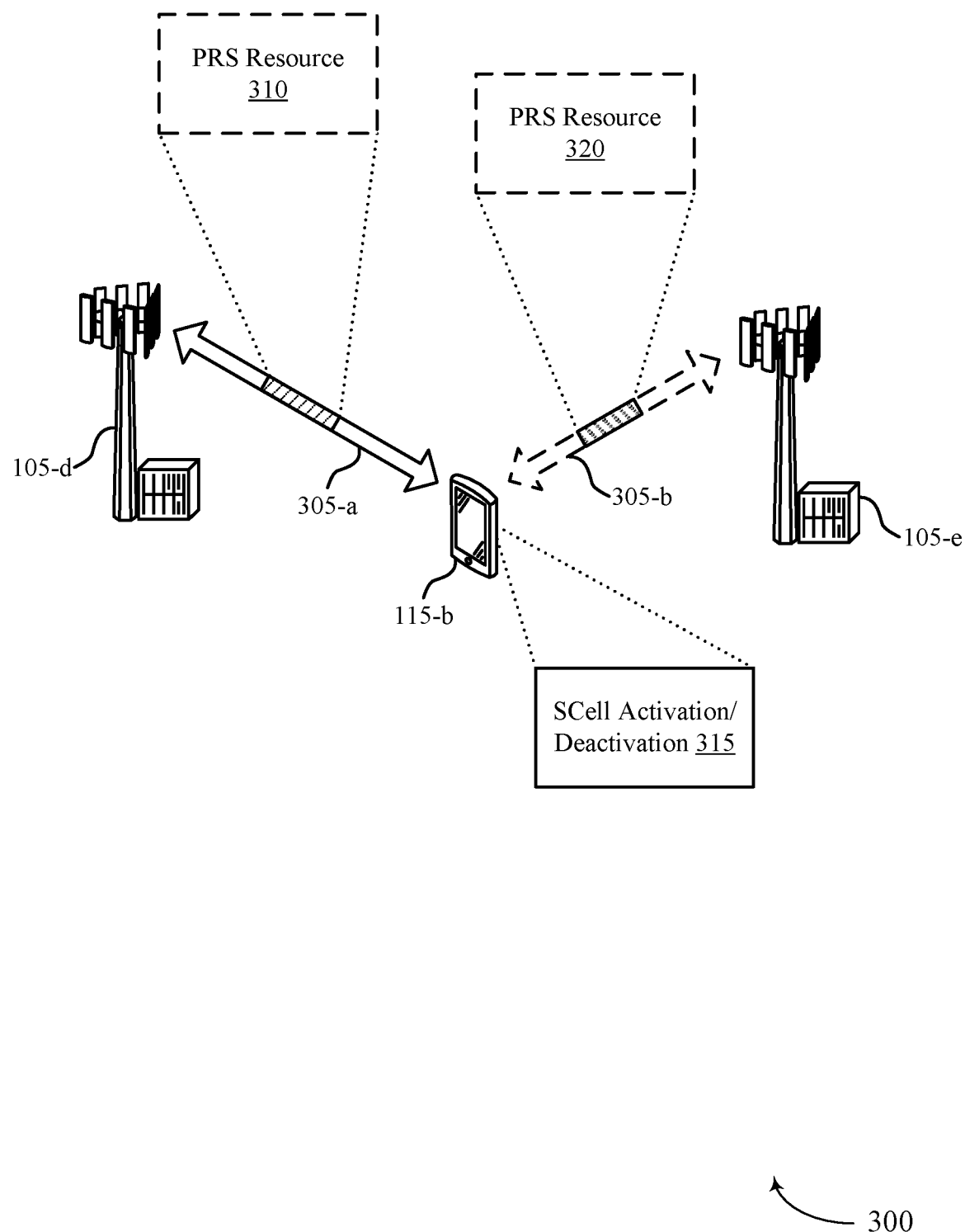
FIG. 3 illustrates an example of a multi-cell positioning procedure that supports interaction of positioning and MAC procedures in accordance with aspects of the present disclosure.

FIG. 3 illustrates an example of a multi-cell positioning procedure 300 that supports interaction of positioning and MAC procedures in accordance with aspects of the present disclosure. In some examples, multi-cell positioning procedure 300 may implement aspects of wireless communications system 100. Multi-cell positioning procedure 300 may include a base station 105-*d*, a base station 105-*e*, and a UE 115-*b*, which may be examples of corresponding base stations 105 and UEs 115, respectively, as described above with reference to FIGS. 1 and 2. In some implementations, base station 105-*d* may be a primary cell (PCell) (or serving cell) of a DC or CA configuration with UE 115-*a*, and base station 105-*e* may be an SCell of the DC or CA configuration. As shown, UE 115-*a* may communicate with base station 105-*d* on resources of a carrier 305-*a* and with base station 105-*e* on resources of a carrier 305-*b*. Additionally or alternatively, UE 115-*a* may communicate with multiple cells simultaneously on a same base station 105, where each cell includes a separate carrier 305. In some implementations, each carrier 305 may be referenced as a separate CC, each carrier 305 may include multiple, separate CCs, or a combination thereof.

As described herein, UE 115-*b* may employ an SCell activation/deactivation and BWP procedure, where UE 115-*b* is allocated resources on one or more CCs to communicate with base station 105-*d*, base station 105-*e*, or both. In some examples, the communications may include reference signals, PRSs, downlink PRSs, uplink PRSs, SSBs, CSI-RSs, SRSs, or additional uplink and downlink signaling. As shown, base station 105-*d* may allocate one or more first CCs on carrier 305-*a* for communications with UE 115-*b* (for example, for transmitting or receiving a PRS resource 310 to or from base station 105-*d*), where the one or more first CCs remain in an active state. Additionally, UE 115-*b* may additionally monitor for a PRS resource 320 on one or more second CCs on carrier 305-*b* configured for communications with base station 105-*e*, even if the one or more second CCs are deactivated. In some implementations, the secondary CCs may be activated or deactivated based on a periodic interval (for example, based on a periodic pattern or on a periodic schedule). Additionally or alternatively, UE 115-*b* may deactivate the secondary CCs based on no communications occurring between UE 115-*b* and base station 105-*e* (for example, the no communications occurring may be determined based on an inactivity timer).

When active, the secondary CCs may allocate resources (for example, for transmitting and receiving PRS resource 320) to UE 115-*b*. Because the secondary CCs transmit based on a periodic interval (for example, periodic or semi-periodic schedule), separate wakeup signals may not be transmitted to the secondary CCs for each activation. In some examples, the secondary CCs may be activated such that the secondary CCs remain active for UE 115-*b* for the duration of respective PRS transmissions. Based on which resources are allocated to UE 115-*b* on the one or more first CCs and the secondary CCs, UE 115-*b* (and base station 105-*d*) may determine a current position of UE 115-*b* through the PRSs on the corresponding PRS resources 310 and 320 of each CC. In some implementations, the position of UE 115-*b* may be determined by combining the PRSs from the multiple CCs. This combination of PRSs may improve the accuracy of the position estimate by effectively creating a larger bandwidth of PRSs.

Additionally, combining the PRSs may involve knowledge of relative phase offsets between each PRS from the multiple CCs. This knowledge may be possible for certain implementation schemes where the multiple CCs share a same radio frequency (RF) processing chain but may be more difficult to obtain when the multiple CCs do not share the same RF processing chain, as the RF processing chain may introduce unknown phase shifts. Thus, UE 115-*b* may indicate to a serving cell (for example, base station 105-*d*) about an implementation scheme used by UE 115-*b* or an ability of UE 115-*b* to coherently combine PRSs across the multiple CCs, where the methods described herein may be conditional or dependent on this ability and indication. This conditional ability may apply separately to uplink and downlink CCs.

In some implementations, base station 105-*d* may configure UE 115-*b* to selectively include or exclude monitoring of other signals (for example, a physical downlink control channel (PDCCH)) during PRS transmissions. Additionally or alternatively, UE 115-*b* may selectively monitor for PRSs and other signals over a time period equal to the duration of a PRS transmission and time periods occurring before and after the PRS transmission. In some examples, PRS resource 320 that is transmitted from base station 105-*e* and received at UE 115-*b* based on a periodic interval may be excluded from SCell inactivity timers (that is, the PRS resource 320 is not treated as a sign of activity). For example, UE 115-*b* may exclude any reference signal transmission (for example, PRS transmissions on PRS resources 320) from secondary CCs which were transmitted on the secondary CCs based on periodic intervals (for example, a periodic PRS or a semi-periodic PRS transmission). In some implementations, these periodic intervals may be indicated to UE 115-*b* via RRC signaling, via a MAC CE, via DCI, or additional signaling used to indicate the configuration. Additionally, UE 115-*b* may exclude PRSs from the SCell inactivity timers based on a time periodicity for the PRSs. For example, UE 115-*b* may exclude periodic or semi-periodic PRSs but not aperiodic PRS for deactivating the SCell inactivity timer. The SCell inactivity timer may enable UE 115-*b* to drop the context of base station 105-*e* if no communications occur before the SCell inactivity timer expires.

Additionally or alternatively, the techniques described above may be applied to BWP inactivity timers for PRSs spanning multiple BWPs. In some implementations, for PRSs spanning multiple BWPs, the inactivity timers can be further expanded to larger bandwidth if needed. For example, one or more of the BWPs may remain inactive except when needed, and UE 115-*b* may monitor an inactive BWP based on a periodic or semi-periodic configuration for PRSs.

Figure 4:
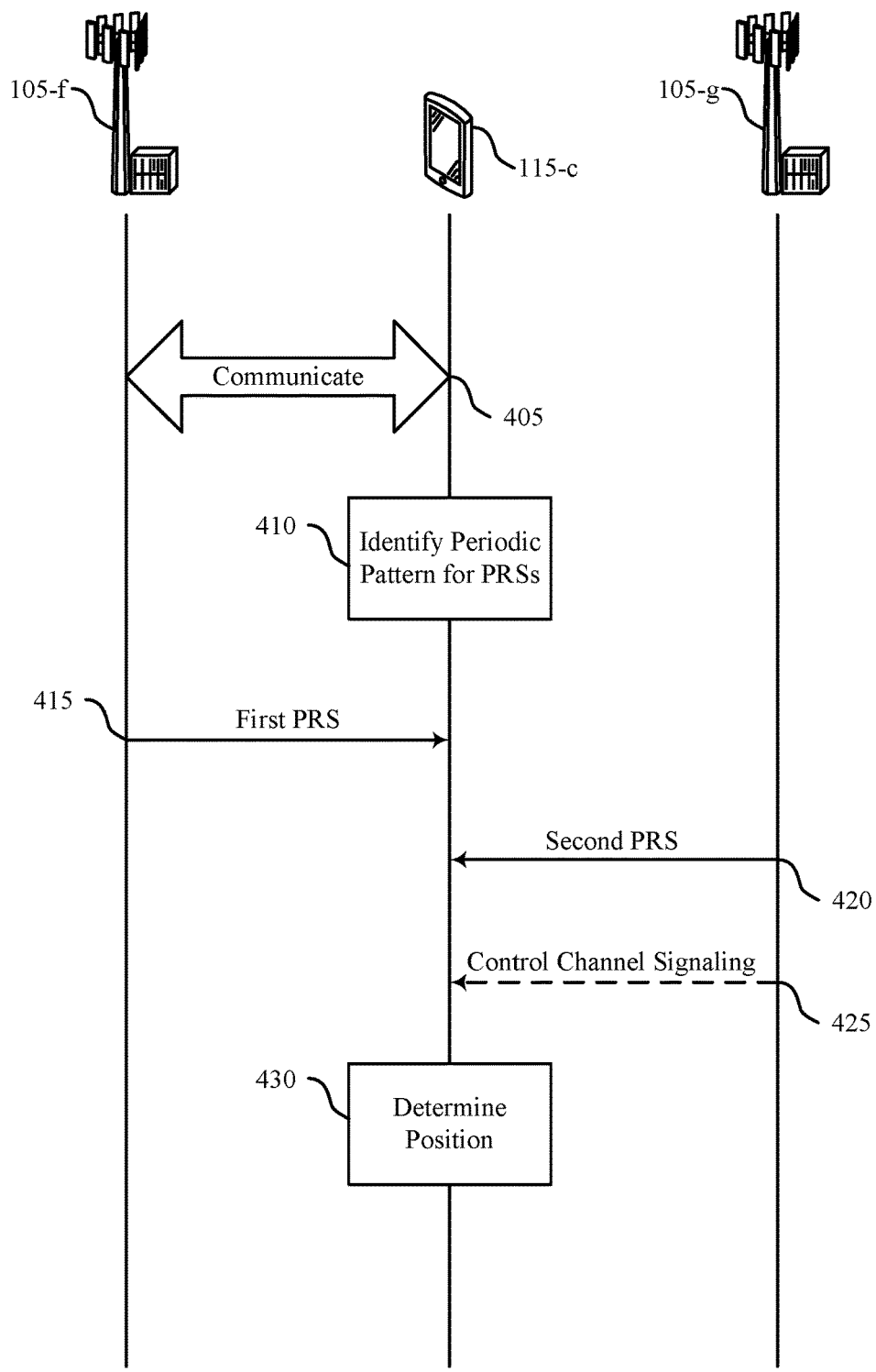
FIGS. 4 and 5 illustrate examples of process flows that supports interaction of positioning and MAC procedures in accordance with aspects of the present disclosure.

FIG. 4 illustrates an example of a process flow 400 that supports interaction of positioning and MAC procedures in accordance with aspects of the present disclosure. In some examples, process flow 400 may implement aspects of wireless communications system 100. Process flow 400 may include a base station 105-*f*, a base station 105-*g*, and a UE 115-*c*, which may be examples of corresponding base stations 105 and UEs 115, respectively, as described above with reference to FIGS. 1-3.

In the following description of the process flow 400, the operations between UE 115-*c*, base station 105-*f*, and base station 105-*g* may be performed in different orders or at different times. Certain operations may also be left out of the process flow 400, or other operations may be added to the process flow 400. While UE 115-*c*, base station 105-*f*, and base station 105-*g* are shown performing a number of the operations of process flow 400, any wireless device may perform the operations shown.

At 405, UE 115-*c* may communicate on a plurality of sets of frequency resources that are in an active state for UE 115-*c*. For example, UE 115-*c* may communicate with base station 105-*f* (that is, a PCell or a serving cell). In some implementations, UE 115-*c* may communicate on the first set of frequency resources based on a configuration that includes the first set of frequency resources and excludes a second set of frequency resources.

At 410, UE 115-*c* may identify a periodic interval to receive PRSs on the plurality of sets of frequency resources, the periodic interval including a first time window for receiving the PRSs during the active state of the plurality of sets of frequency resources for UE 115-*c*, and a second time window for an inactive state of the plurality of sets of frequency resources for UE 115-*c*. In some implementations, UE 115-*c* may receive a configuration indicating the periodic interval, where the periodic interval is identified based on the received configuration. Additionally, UE 115-*c* may receive the configuration via RRC, via a MAC CE, via DCI, or additional signaling that indicates the configuration.

At 415 and 420, UE 115-*c* may receive, during the first time window of the periodic interval, a first PRS on a first set of frequency resources of the plurality of sets of frequency resources and a second PRS on the second set of frequency resources of the plurality of sets of frequency resources. In some implementations, the first set of frequency resources may include a first CC, where the plurality of sets of frequency resources may include one or more CCs different than the first CC, and the second set of frequency resources may include a second CC of the one or more CCs. Additionally or alternatively, the first set of frequency resources may include a first BWP, the plurality of sets of frequency resources may include one or more BWPs different than the first BWP, and the second set of frequency resources may include a second BWP of the one or more BWPs. Additionally or alternatively, the plurality of sets of frequency resources may be another unit of frequency resources carrying PRSs, where the other unit of frequency resources may be selectively activated and deactivated (for example, rendered inactive) by UE 115-*c*.

In some implementations, receiving the first PRS and the second PRS may include receiving, during the first time window of the periodic interval, the first PRS from base station 105-*f* (for example, a first base station 105) on the first set of frequency resources and the second PRS from base station 105-*g* (for example, a second base station 105) on the second set of frequency resources. Additionally or alternatively, receiving the first PRS and the second PRS may include receiving, during the first time window of the periodic interval, the first PRS from base station 105-*f* on the first set of frequency resources and the second PRS from base station 105-*f* (for example, a same base station 105) on the second set of frequency resources.

At 425, UE 115-*c* may receive on the second set of frequency resources, control channel signaling during the first time window. In some implementations, the second PRS and the control channel signaling may be received during a same set of one or more symbol periods. Additionally or alternatively, the second PRS may be received in a first set of one or more symbol periods and the control channel signaling may be received in a second set of one or more symbol periods adjacent to the first set of one or more symbol periods.

At 430, UE 115-c may determine a position of itself based on the received first PRS and the received second PRS. In some examples, the determined position may then be used by UE 115-c to perform other actions described herein, such as a mobility procedure (for example, as further described beginning with reference to 515 of process flow 500).

Figure 5:
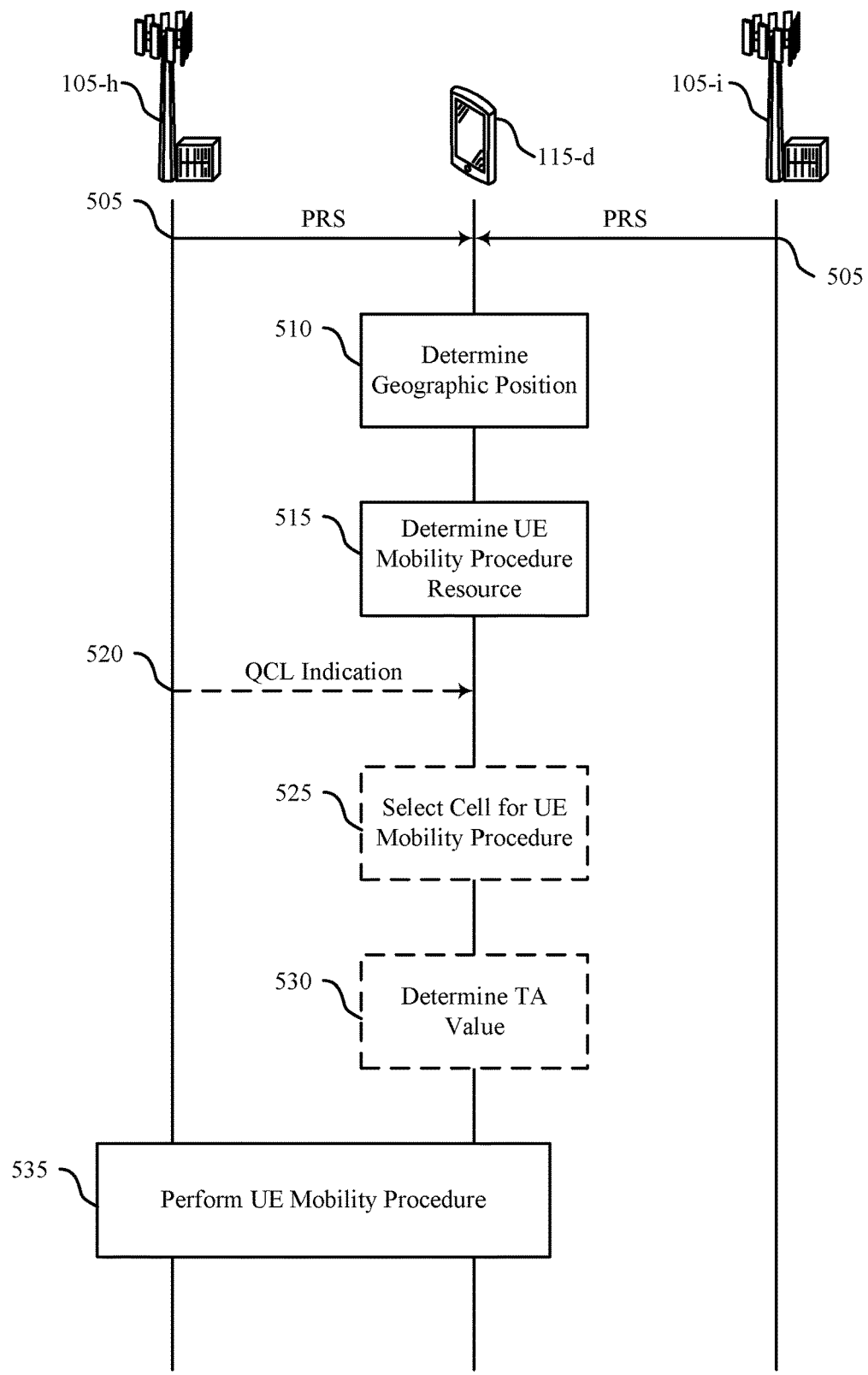

FIG. 5 illustrates an example of a process flow 500 that supports interaction of positioning and MAC procedures in accordance with aspects of the present disclosure. In some examples, process flow 500 may implement aspects of wireless communications system 100. Process flow 400 may include a base station 105-h, a base station 105-i, and a UE 115-c, which may be examples of corresponding base stations 105 and UEs 115, respectively, as described above with reference to FIGS. 1-4.

In the following description of the process flow 500, the operations between UE 115-d, base station 105-h, and base station 105-i may be performed in different orders or at different times. Certain operations may also be left out of the process flow 500, or other operations may be added to the process flow 500. While UE 115-d, base station 105-h, and base station 105-i are shown performing a number of the operations of process flow 500, any wireless device may perform the operations shown.

At 505, UE 115-d may receive one or more PRSs from one or more cells (for example, from base stations 105-h and 105-i). In some implementations, the one or more PRSs may include a set of BFD-RSs, or a set of CSI-RSs, or a set of dedicated PRSs, or a combination thereof. Additionally or alternatively, the one or more PRSs may be QCLed with a set of BFD-RSs, or a set of CSI-RSs, or a combination thereof.

At 510, UE 115-d may determine a geographic position of itself based on the received one or more PRS.

At 515, UE 115-d may determine, based on the determined geographic position of itself, a resource for a UE mobility procedure associated with a selected cell. In some implementations, UE 115-d may determine that the determined resource was previously identified for the UE mobility procedure at the determined geographic position. Additionally or alternatively, UE 115-d may determine the resource for the UE mobility procedure based on receiving information that identifies a set of geographic positions and a set of cells and that indicates a relationship between the set of geographic positions and the set of cells.

At 520, UE 115-d may receive an indication that the determined resource for the UE mobility procedure is QCLed with a PRS (for example, from base station 105-h). In some implementations, UE 115-d may receive RRC signaling that includes the indication, where the UE mobility procedure includes a CFRA procedure. Additionally or alternatively, UE 115-d may receive system information (for example, Pos-SIBs) that includes the indication, where the system information configures PRSs, and the UE mobility procedure includes a CBRA procedure.

At 525, UE 115-d may select the cell based on the received information and the determined geographic position of UE 115-d. In some implementations, the selecting may be based on the determination that the determined resource was previously identified. Additionally, UE 115-d may determine, for the UE mobility procedure, the resource corresponding to the selected cell. In some implementations, UE 115-d may identify a strongest beam of a set of beams and may select the cell based on the received information, the determined geographic position of UE 115-d, and the identified strongest beam.

Additionally or alternatively, UE 115-d may identify, based on the received information and the determined geographic position, a first candidate cell of the set of cells and a second candidate cell of the set of cells and may select the first candidate cell as the selected cell based on determining that the first candidate cell includes one or more RRHs. In some implementations, UE 115-d may receive system information indicating that the first candidate cell includes the one or more RRHs, where the system information is received from the first candidate cell (for example, in a MIB or SIB) or a current serving cell of UE 115-d (for example, in a neighbor-cell or candidate-cell list which may include a cell ID and other information about the first candidate cell, such as the number of RRHs). Additionally, UE 115-d may identify information stored within itself indicating that the first candidate cell includes the one or more RRHs, the information stored within itself during a time period before the receiving the one or more of PRSs, where UE 115-d is wirelessly connected to the first candidate cell during at least a portion of the time period. In some implementations, UE 115-d may determine a position of itself relative to the one or more RRHs of the first candidate cell and may select the first candidate cell as the selected cell based on determining that the first candidate cell includes the one or more RRHs and the determined geographic position of the UE relative to the one or more RRHs.

Additionally or alternatively, UE 115-d may determine the resource for the UE mobility procedure based on receiving information that identifies a set of geographic positions and a set of beams and that indicates a relationship between the set of geographic positions and the set of beams. UE 115-d may then select an SSB based on the received information and the determined geographic position of UE 115-d and may determine, for the UE mobility procedure, the resource corresponding to the selected SSB.

At 530, UE 115-d may identify, for each base station 105 (for example, base stations 105-h and 105-i) of a set of base stations 105 associated with the one or more cells, a geographic position of the base station 105 and may determine, based on the geographic position of UE 115-d and the identified geographic positions of the set of base stations 105, a TA value for UE 115-d to use to perform the UE mobility procedure to establish the connection with the cell, the cell served by a first base station 105 (for example, base station 105-h or base station 105-i) of the set of base stations 105. In some implementations, the TA value may be determined prior to UE 115-d receiving a TA command from the selected cell.

At 535, UE 115-d may perform, using the determined resource, the UE mobility procedure to establish a connection with the selected cell (for example, with base station 105-h or base station 105-i). In some implementations, UE 115-d may transmit, to the selected cell, a first message of a RACH procedure based on the determined timing advance value. Additionally or alternatively, the UE mobility procedure may include a RACH procedure with the selected cell. In some implementations, the UE mobility procedure may include a handover procedure from a source cell to the selected cell (for example, from base station 105-h to base station 105-i).

Figure 6:
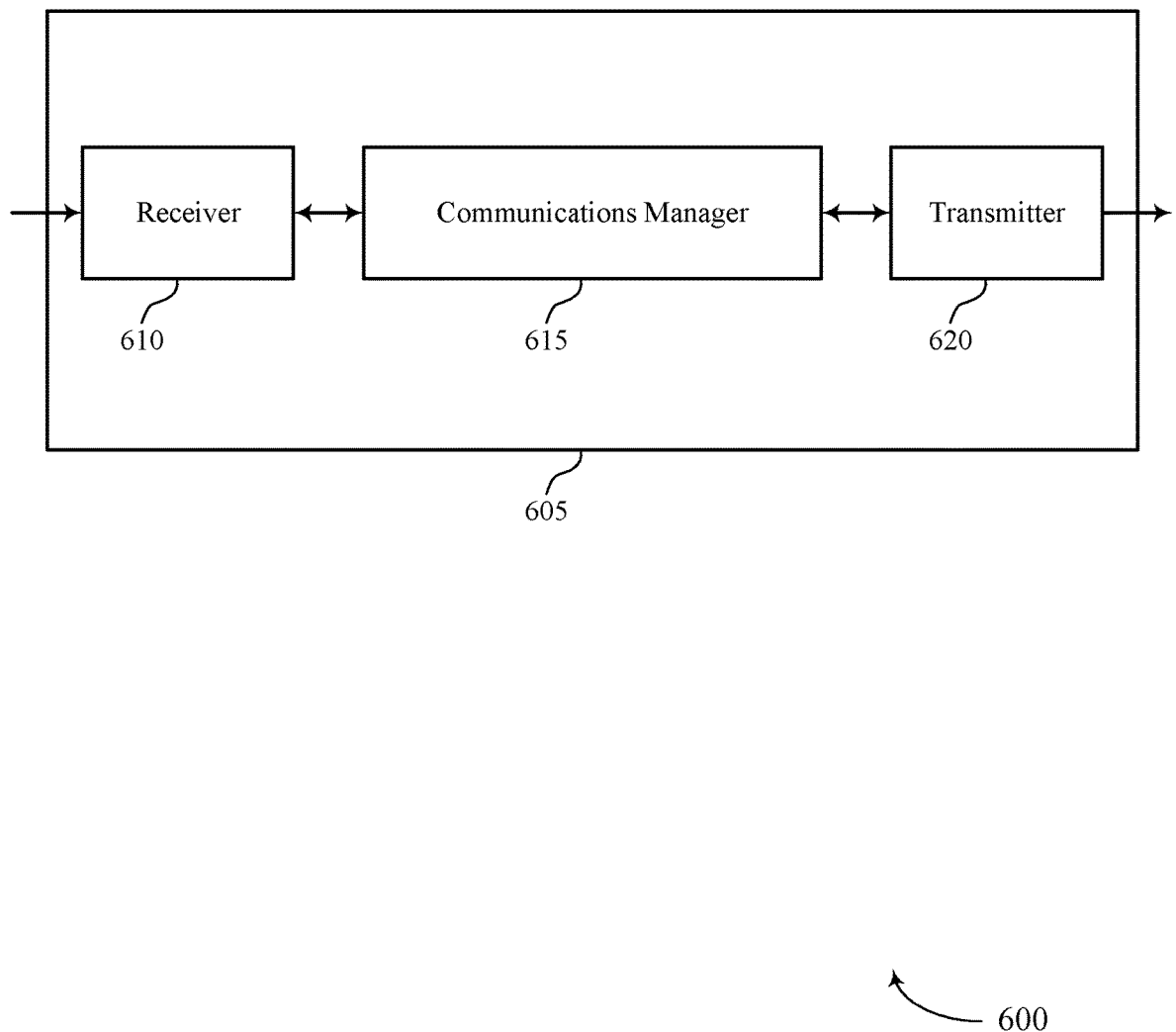
FIGS. 6 and 7 show block diagrams of devices that support interaction of positioning and MAC procedures in accordance with aspects of the present disclosure.

FIG. 6 shows a block diagram 600 of a device 605 that supports interaction of positioning and MAC procedures in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (for example, via one or more buses).

The receiver 610 may receive information such as packets, user data, or control information associated with various information channels (for example, control channels, data channels, and information related to interaction of positioning and MAC procedures). Information may be passed on to other components of the device 605. The receiver 610 may be an example of aspects of the transceiver 920 described with reference to FIG. 9. The receiver 610 may utilize a single antenna or a set of antennas.

The communications manager 615 may communicate on a plurality of sets of frequency resources that are in an active state for the UE. In some implementations, the communications manager 615 may identify a periodic interval to receive PRSs on the plurality of sets of frequency resources, the periodic interval including a first time window for receiving the PRSs during the active state of the plurality of sets of frequency resources for the UE, and a second time window for an inactive state of the plurality of sets of frequency resources for the UE. Additionally, the communications manager 615 may receive, during the first time window of the periodic interval, a first PRS on a first set of frequency resources of the plurality of sets of frequency resources and a second PRS on a second set of frequency resources of the plurality of sets of frequency resources. In some implementations, the communications manager 615 may determine a position of the UE based on the received first PRS and the received second PRS.

Additionally or alternatively, the communications manager 615 may receive a set of PRSs from a set of cells. In some implementations, the communications manager 615 may determine a geographic position of the UE based on the received set of PRSs. Additionally, the communications manager 615 may determine, based on the determined geographic position of the UE, a resource for a UE mobility procedure associated with a selected cell. In some implementations, the communications manager 615 may perform, using the determined resource, the UE mobility procedure to establish a connection with the selected cell. The communications manager 615 may be an example of aspects of the communications manager 910 described herein.

In some examples, the communications manager 915 as described herein may be implemented to realize one or more potential advantages for a UE 115. For example, by determining the position of the UE 115 based on multiple PRSs, the UE 115 may more reliably determine the position by using multiple PRSs with multiple cells rather than a single PRS from a single cell. Additionally, by using one or more of the PRSs that are received during a time window for an inactive state of the UE 115 with a cell, the UE 115 may decrease latency for determining the position by using the inactive state for determining the position as well as an active state rather than waiting for the inactive state to become active to receive or transmit PRSs for the corresponding cell. Additionally or alternatively, by performing a UE mobility procedure based on the position of the UE 115, the communications manager 915 may enable the UE 115 to perform the UE mobility procedure more efficiently, such as decreasing signaling overhead and reducing power consumption that would arise from unsuccessfully performing the UE mobility procedure one or more times using configurations that do not take the position of the UE 115 into account or as an advantage (for example, using BWPs or CCs that are not as strong to attempt the UE mobility procedure at a current position of the UE 115).

The communications manager 615, or its sub-components, may be implemented in hardware, code (for example, software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at different locations, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
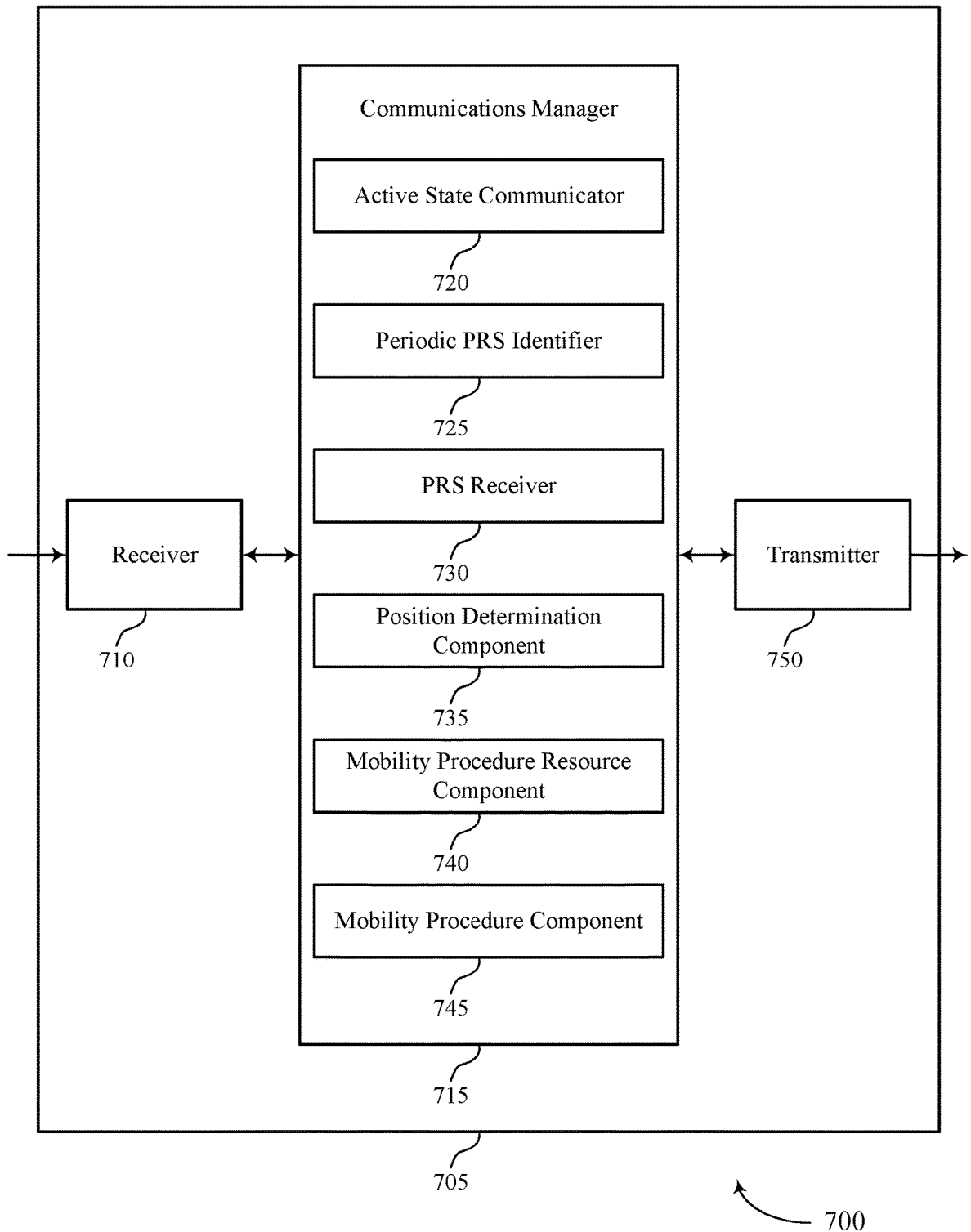

FIG. 7 shows a block diagram 700 of a device 705 that supports interaction of positioning and MAC procedures in accordance with aspects of the present disclosure. The device 705 may be an example of aspects of a device 605, or a UE 115 as described herein. The device 705 may include a receiver 710, a communications manager 715, and a transmitter 750. The device 705 may also include a processor. Each of these components may be in communication with one another (for example, via one or more buses).

The receiver 710 may receive information such as packets, user data, or control information associated with various information channels (for example, control channels, data channels, and information related to interaction of positioning and MAC procedures). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include an active state communicator 720, a periodic PRS identifier 725, a PRS receiver 730, a position determination component 735, a mobility procedure resource component 740, and a mobility procedure component 745. The communications manager 715 may be an example of aspects of the communications manager 910 described herein.

The active state communicator 720 may communicate on a plurality of sets of frequency resources that are in an active state for the UE.

The periodic PRS identifier 725 may identify a periodic interval to receive PRSs on the plurality of sets of frequency resources, the periodic interval including a first time window for receiving the PRSs during the active state of the plurality of sets of frequency resources for the UE, and a second time window for an inactive state of the plurality of sets of frequency resources for the UE.

The PRS receiver 730 may receive, during the first time window of the periodic interval, a first PRS on a first set of frequency resources of the plurality of sets of frequency resources and a second PRS on a second set of frequency resources of the plurality of sets of frequency resources.

The position determination component 735 may determine a position of the UE based on the received first PRS and the received second PRS.

In some implementations, the PRS receiver 730 may receive a set of PRSs from a set of cells.

In some implementations, the position determination component 735 may determine a geographic position of the UE based on the received set of PRSs.

The mobility procedure resource component 740 may determine, based on the determined geographic position of the UE, a resource for a UE mobility procedure associated with a selected cell.

The mobility procedure component 745 may perform, using the determined resource, the UE mobility procedure to establish a connection with the selected cell.

Based on techniques for determining a position of a UE 115 based on a received first PRS and a received second PRS, a processor of the UE 115 (for example, controlling the receiver 710, the transmitter 750, or the transceiver 920 as described with reference to FIG. 9) may increase reliability of the UE 115 determining an accurate position (for example, based on using multiple PRSs) and may reduce latency for the UE 115 to determine the position based on using PRSs received during inactive states and active states. Additionally or alternatively, by performing a UE mobility procedure using a resource based on the position of the UE 115, the processor of the UE 115 may increase a reliability that the UE mobility procedure is successful for the UE 115, reducing signaling overhead and power consumption for unsuccessfully performing the UE mobility procedure multiple times.

The transmitter 750 may transmit signals generated by other components of the device 705. In some examples, the transmitter 750 may be collocated with a receiver 710 in a transceiver module. For example, the transmitter 750 may be an example of aspects of the transceiver 920 described with reference to FIG. 9. The transmitter 750 may utilize a single antenna or a set of antennas.

Figure 8:
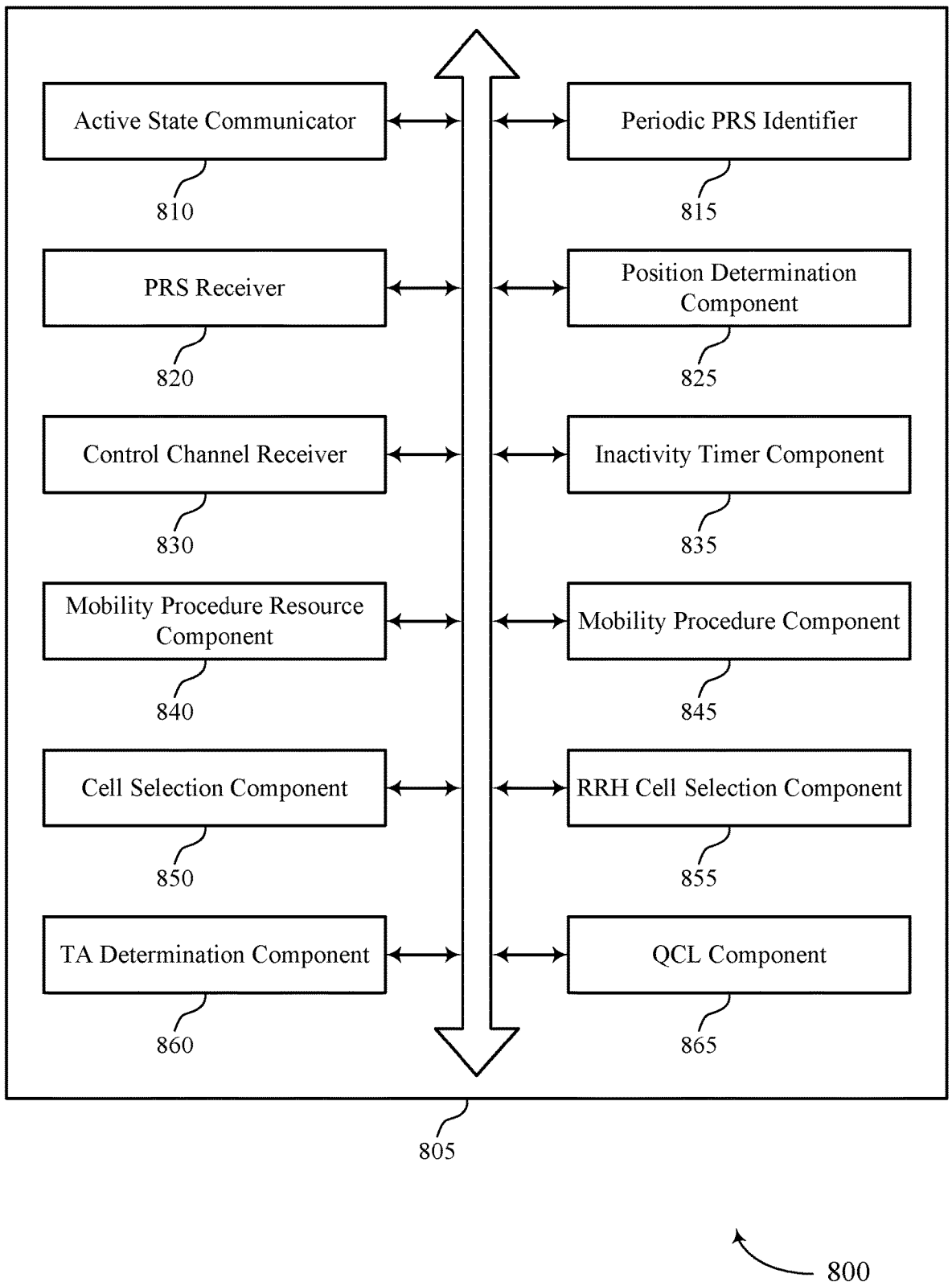
FIG. 8 shows a block diagram of a communications manager that supports interaction of positioning and MAC procedures in accordance with aspects of the present disclosure.

FIG. 8 shows a block diagram 800 of a communications manager 805 that supports interaction of positioning and MAC procedures in accordance with aspects of the present disclosure. The communications manager 805 may be an example of aspects of a communications manager 615, a communications manager 715, or a communications manager 910 described herein. The communications manager 805 may include an active state communicator 810, a periodic PRS identifier 815, a PRS receiver 820, a position determination component 825, a control channel receiver 830, an inactivity timer component 835, a mobility procedure resource component 840, a mobility procedure component 845, a cell selection component 850, an RRH cell selection component 855, a TA determination component 860, and a QCL component 865. Each of these modules may communicate, directly or indirectly, with one another (for example, via one or more buses).

The active state communicator 810 may communicate on a plurality of sets of frequency resources that are in an active state for the UE. In some examples, the active state communicator 810 may communicate on a first set of frequency resources of the plurality of sets of frequency resources based on a configuration that includes the first set of frequency resources and excludes a second set of frequency resources of the plurality of sets of frequency resources.

The periodic PRS identifier 815 may identify a periodic interval to receive PRSs on the plurality of sets of frequency resources, the periodic interval including a first time window for receiving the PRSs during the active state of the plurality of sets of frequency resources for the UE and a second time window for an inactive state of the plurality of sets of frequency resources for the UE. In some examples, the periodic PRS identifier 815 may receive a configuration indicating the periodic interval, where the periodic interval is identified based on the received configuration. In some implementations, receiving the configuration may include receiving RRC signaling that indicates the configuration.

The PRS receiver 820 may receive, during the first time window of the periodic interval, a first PRS on a first set of frequency resources of the plurality of sets of frequency resources and a second PRS on a second set of frequency resources of the plurality of sets of frequency resources. In some examples, the PRS receiver 820 may receive, during the first time window of the periodic interval, the first PRS from a first base station on the first set of frequency resources and the second PRS from a second base station on the second set of frequency resources. Additionally or alternatively, the PRS receiver 820 may receive, during the first time window of the periodic interval, the first PRS from a base station on the first set of frequency resources and the second PRS from the base station on the second set of frequency resources.

In some implementations, the first set of frequency resources may include a first CC, the plurality of sets of frequency resources may include one or more CCs different than the first CC, and the second set of frequency resources may include a second CC of the one or more CCs. Additionally or alternatively, the first set of frequency resources may include a first BWP, the plurality of sets of frequency resources includes one or more BWPs different than the first BWP, and the second set of frequency resources may include a second BWP of the one or more BWPs.

Additionally or alternatively, in some implementations, the PRS receiver 820 may receive a set of PRSs from a set of cells. In some examples, the set of PRSs may include a set of BFD-RSs, or a set of CSI-RSs, or a set of dedicated PRSs, or a combination thereof. Additionally or alternatively, the set of PRSs may be QCLed with a set of BFD-RSs, or a set of CSI-RSs, or a combination thereof.

The position determination component 825 may determine a position of the UE based on the received first PRS and the received second PRS. In some implementations, the position determination component 825 may determine a geographic position of the UE based on the received set of PRSs.

The mobility procedure resource component 840 may determine, based on the determined geographic position of the UE, a resource for a UE mobility procedure associated with a selected cell. In some examples, the mobility procedure resource component 840 may determine that the determined resource was previously identified for the UE mobility procedure at the determined geographic position, the selected cell based on the determination that the determined resource was previously identified.

Additionally or alternatively, the mobility procedure resource component 840 may receive information that identifies a set of geographic positions and a set of beams and that indicates a relationship between the set of geographic positions and the set of beams, may select an SSB based on the received information and the determined geographic position of the UE, and may determine, for the UE mobility procedure, the resource corresponding to the selected SSB.

The mobility procedure component 845 may perform, using the determined resource, the UE mobility procedure to establish a connection with the selected cell. Additionally or alternatively, the mobility procedure component 845 may perform a random access procedure (for example, a RACH procedure) with the selected cell. In some implementations, the mobility procedure component 845 may perform a handover procedure from a source cell to the selected cell.

The control channel receiver 830 may receive, on the second set of frequency resources, control channel signaling during the first time window. In some implementations, the second PRS and the control channel signaling may be received during a same set of one or more symbol periods. Additionally or alternatively, the second PRS may be received in a first set of one or more symbol periods, and the control channel signaling may be received in a second set of one or more symbol periods adjacent to the first set of one or more symbol periods.

The inactivity timer component 835 may maintain an inactivity timer indicating an inactive state of the second set of frequency resources for the UE during the second time window while communicating on the first set of frequency resources that are in the active state for the UE during the second time window.

The cell selection component 850 may receive information that identifies a set of geographic positions and a set of cells and that indicates a relationship between the set of geographic positions and the set of cells, may select the cell based on the received information and the determined geographic position of the UE, and may determine, for the UE mobility procedure, the resource corresponding to the selected cell. Additionally or alternatively, the cell selection component 850 may identify a strongest beam of a set of beams and may select the cell based on the received information, the determined geographic position of the UE, and the identified strongest beam.

The RRH cell selection component 855 may identify, based on the received information and the determined geographic position, a first candidate cell of the set of cells and a second candidate cell of the set of cells and may select the first candidate cell as the selected cell based on determining that the first candidate cell includes one or more RRHs. In some examples, the RRH cell selection component 855 may receive system information indicating that the first candidate cell includes the one or more RRHs, where the system information is received from the first candidate cell or a current serving cell of the UE.

Additionally or alternatively, the RRH cell selection component 855 may identify information stored at the UE indicating that the first candidate cell includes the one or more RRHs, where the information is stored at the UE during a time period before the receiving the set of PRSs, and where the UE is wirelessly connected to the first candidate cell during at least a portion of the time period. In some implementations, the RRH cell selection component 855 may determine a position of the UE relative to the one or more RRHs of the first candidate cell and may select the first candidate cell as the cell based on determining that the first candidate cell includes the one or more RRHs and the determined geographic position of the UE relative to the one or more RRHs.

The TA determination component 860 may identify, for each base station of a set of base stations associated with the set of cells, a geographic position of the base station and may determine, based on the geographic position of the UE and the identified geographic positions of the set of base stations, a TA value for the UE to use to perform the UE mobility procedure to establish the connection with the cell, the cell served by a first base station of the set of base stations. In some examples, the TA determination component 860 may transmit, to the selected cell, a first message of a random access procedure based on the determined TA value. In some implementations, the TA value may be determined prior to the UE receiving a TA command from the selected cell.

The QCL component 865 may receive an indication that the determined resource for the UE mobility procedure is QCLed with a PRS. In some examples, the QCL component 865 may receive RRC signaling including the indication, where the UE mobility procedure includes a CFRA procedure. Additionally or alternatively, the QCL component 865 may receive system information including the indication, where the system information configures PRSs, and the UE mobility procedure includes a CBRA procedure.

Figure 9:
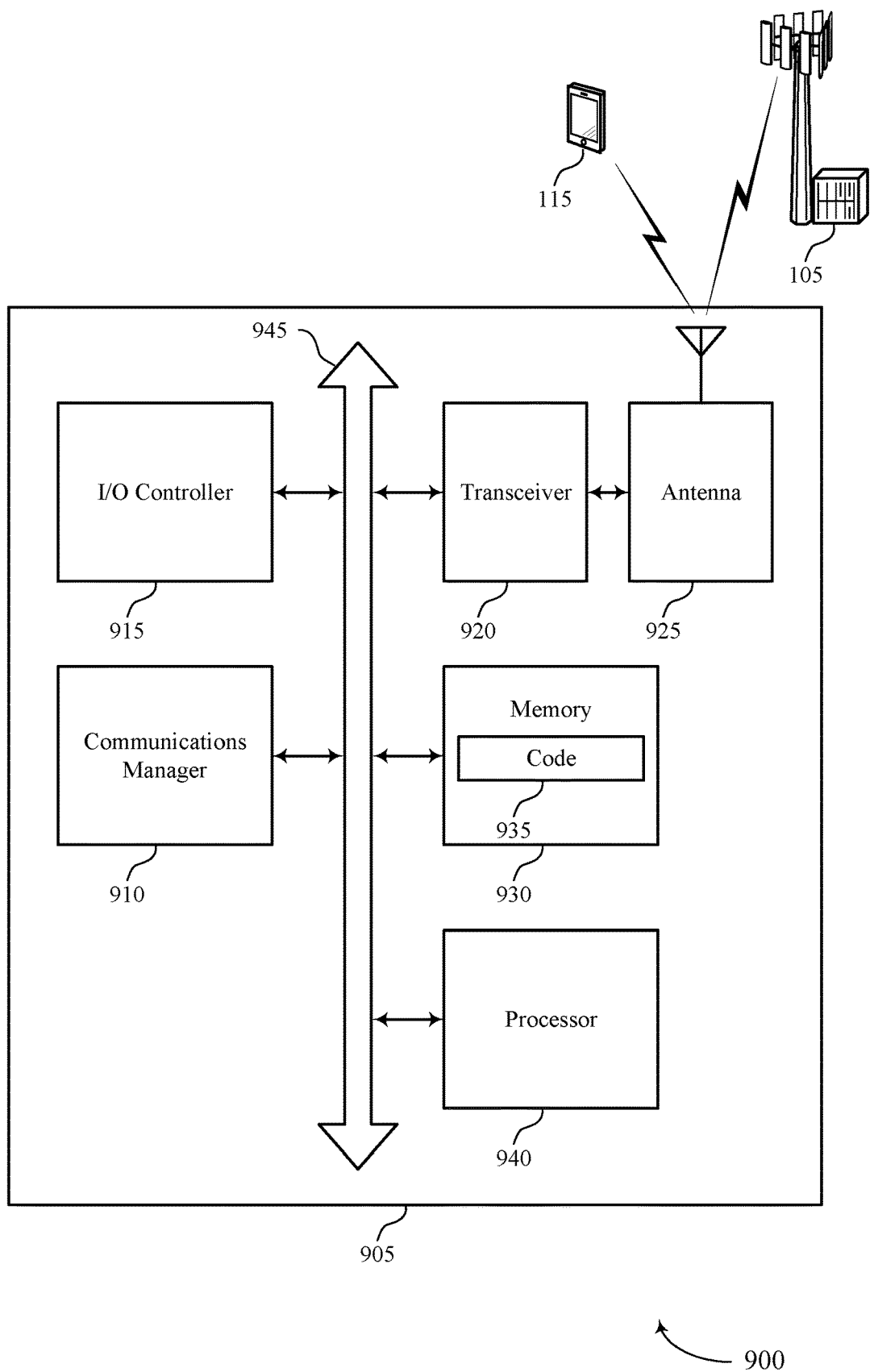
FIG. 9 shows a diagram of a system including a device that supports interaction of positioning and MAC procedures in accordance with aspects of the present disclosure.

FIG. 9 shows a diagram of a system 900 including a device 905 that supports interaction of positioning and MAC procedures in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (for example, bus 945).

The communications manager 910 may communicate on a plurality of sets of frequency resources that are in an active state for the UE. In some implementations, the communications manager 910 may identify a periodic interval to receive PRSs on the plurality of sets of frequency resources, the periodic interval including a first time window for receiving the PRSs during the active state of the plurality of sets of frequency resources for the UE and a second time window for an inactive state of the plurality of sets of frequency resources for the UE. Additionally, the communications manager 910 may receive, during the first time window of the periodic interval, a first PRS on a first set of frequency resources of the plurality of sets of frequency resources and a second PRS on a second set of frequency resources of the plurality of sets of frequency resources. In some implementations, the communications manager 910 may determine a position of the UE based on the received first PRS and the received second PRS.

Additionally or alternatively, the communications manager 910 may receive a set of PRSs from a set of cells. In some implementations, the communications manager 910 may determine a geographic position of the UE based on the received set of PRSs. Additionally, the communications manager 910 may determine, based on the determined geographic position of the UE, a resource for a UE mobility procedure associated with a selected cell. In some implementations, the communications manager 910 may perform, using the determined resource, the UE mobility procedure to establish a connection with the selected cell.

The I/O controller 915 may manage input and output signals for the device 905. The I/O controller 915 may also manage peripherals not integrated into the device 905. In some implementations, the I/O controller 915 may represent a physical connection or port to an external peripheral. In some implementations, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some implementations, the I/O controller 915 may be implemented as part of a processor. In some implementations, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some implementations, the wireless device may include a single antenna 925. However, in some implementations, the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some implementations, the memory 930 may contain, among other things, a basic I/O system (BIOS) which may control basic hardware or software operation such as the interaction with peripheral components or devices.

The processor 940 may include an intelligent hardware device, (for example, a general-purpose processor, a DSP, a central processing unit (CPU), a microcontroller, an ASIC, an FPGA, a programmable logic device, a discrete gate or transistor logic component, a discrete hardware component, or any combination thereof). In some implementations, the processor 940 may be configured to operate a memory array using a memory controller. In other cases, a memory controller may be integrated into the processor 940. The processor 940 may be configured to execute computer-readable instructions stored in a memory (for example, the memory 930) to cause the device 905 to perform various functions (for example, functions or tasks supporting interaction of positioning and MAC procedures).

The code 935 may include instructions to implement aspects of the present disclosure, including instructions to support wireless communications. The code 935 may be stored in a non-transitory computer-readable medium such as system memory or other type of memory. In some implementations, the code 935 may not be directly executable by the processor 940 but may cause a computer (for example, when compiled and executed) to perform functions described herein.

Figure 10:
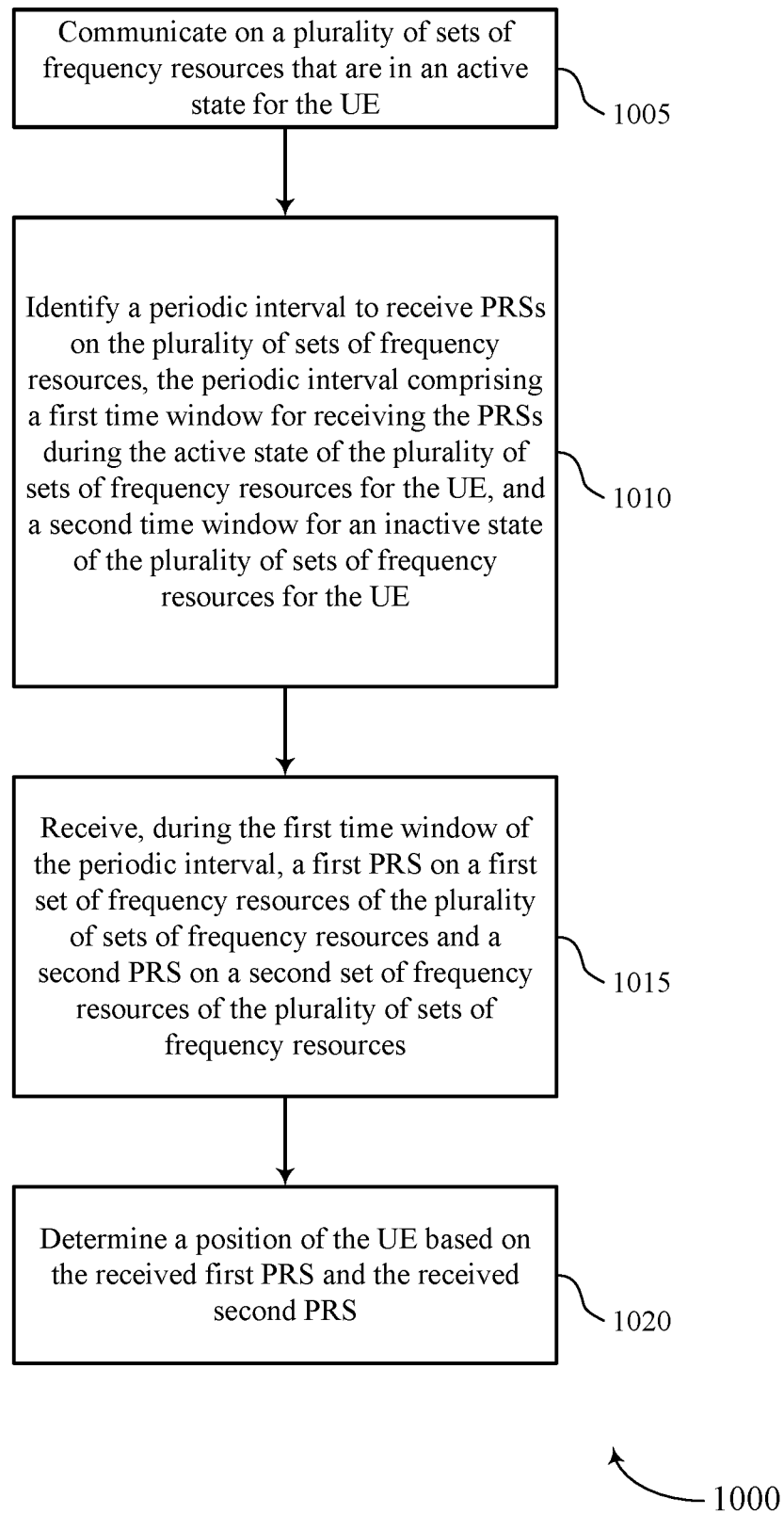
FIGS. 10 through 14 show flowcharts illustrating methods that support interaction of positioning and MAC procedures in accordance with aspects of the present disclosure.

FIG. 10 shows a flowchart illustrating a method 1000 that supports interaction of positioning and MAC procedures in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1005, the UE may communicate on a plurality of sets of frequency resources that are in an active state for the UE. The operations of 1005 may be performed according to the methods described herein. In some examples, aspects of the operations of 1005 may be performed by an active state communicator as described with reference to FIGS. 6 through 9.

At 1010, the UE may identify a periodic interval to receive PRSs on the plurality of sets of frequency resources, the periodic interval including a first time window for receiving the PRSs during the active state of the plurality of sets of frequency resources for the UE, and a second time window for an inactive state of the plurality of sets of frequency resources for the UE. The operations of 1010 may be performed according to the methods described herein. In some examples, aspects of the operations of 1010 may be performed by a periodic PRS identifier as described with reference to FIGS. 6 through 9.

At 1015, the UE may receive, during the first time window of the periodic interval, a first PRS on a first set of frequency resources of the plurality of sets of frequency resources and a second PRS on a second set of frequency resources of the plurality of sets of frequency resources. The operations of 1015 may be performed according to the methods described herein. In some examples, aspects of the operations of 1015 may be performed by a PRS receiver as described with reference to FIGS. 6 through 9.

At 1020, the UE may determine a position of the UE based on the received first PRS and the received second PRS. The operations of 1020 may be performed according to the methods described herein. In some examples, aspects of the operations of 1020 may be performed by a position determination component as described with reference to FIGS. 6 through 9.

Figure 11:
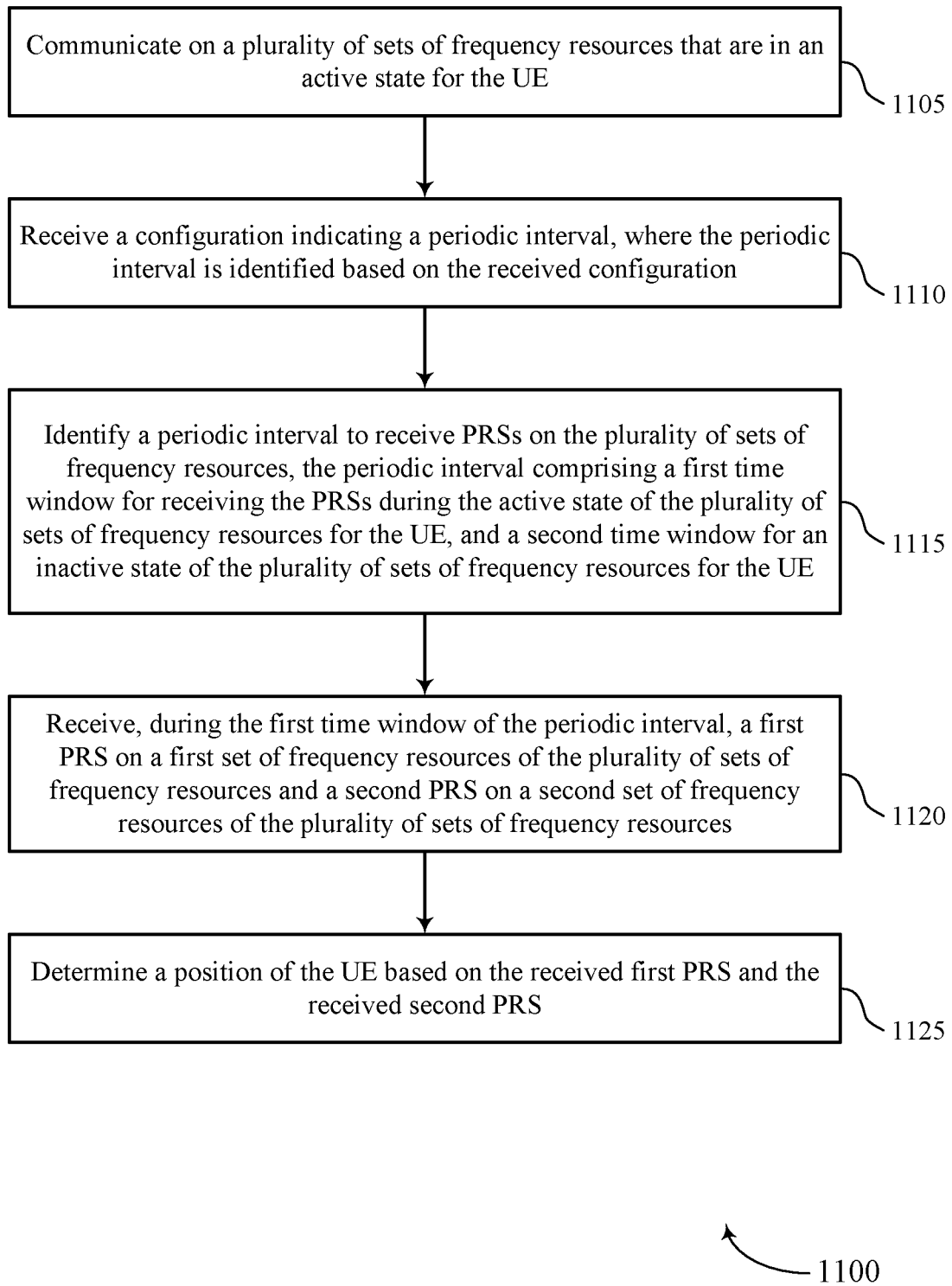

FIG. 11 shows a flowchart illustrating a method 1100 that supports interaction of positioning and MAC procedures in accordance with aspects of the present disclosure. The operations of method 1100 may be implemented by a UE 115 or its components as described herein. For example, the operations of method 1100 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1105, the UE may communicate on a plurality of sets of frequency resources that are in an active state for the UE. The operations of 1105 may be performed according to the methods described herein. In some examples, aspects of the operations of 1105 may be performed by an active state communicator as described with reference to FIGS. 6 through 9.

At 1110, the UE may receive a configuration indicating the periodic interval, where the periodic interval is identified based on the received configuration. The operations of 1110 may be performed according to the methods described herein. In some examples, aspects of the operations of 1110 may be performed by a periodic PRS identifier as described with reference to FIGS. 6 through 9.

At 1115, the UE may identify a periodic interval to receive PRSs on the plurality of sets of frequency resources, the periodic interval including a first time window for receiving the PRSs during the active state of the plurality of sets of frequency resources for the UE, and a second time window for an inactive state of the plurality of sets of frequency resources for the UE. The operations of 1115 may be performed according to the methods described herein. In some examples, aspects of the operations of 1115 may be performed by a periodic PRS identifier as described with reference to FIGS. 6 through 9.

At 1120, the UE may receive, during the first time window of the periodic interval, a first PRS on the first set of frequency resources of the plurality of sets of frequency resources and a second PRS on a second set of frequency resources of the plurality of sets of frequency resources. The operations of 1120 may be performed according to the methods described herein. In some examples, aspects of the operations of 1120 may be performed by a PRS receiver as described with reference to FIGS. 6 through 9.

At 1125, the UE may determine a position of the UE based on the received first PRS and the received second PRS. The operations of 1125 may be performed according to the methods described herein. In some examples, aspects of the operations of 1125 may be performed by a position determination component as described with reference to FIGS. 6 through 9.

Figure 12:
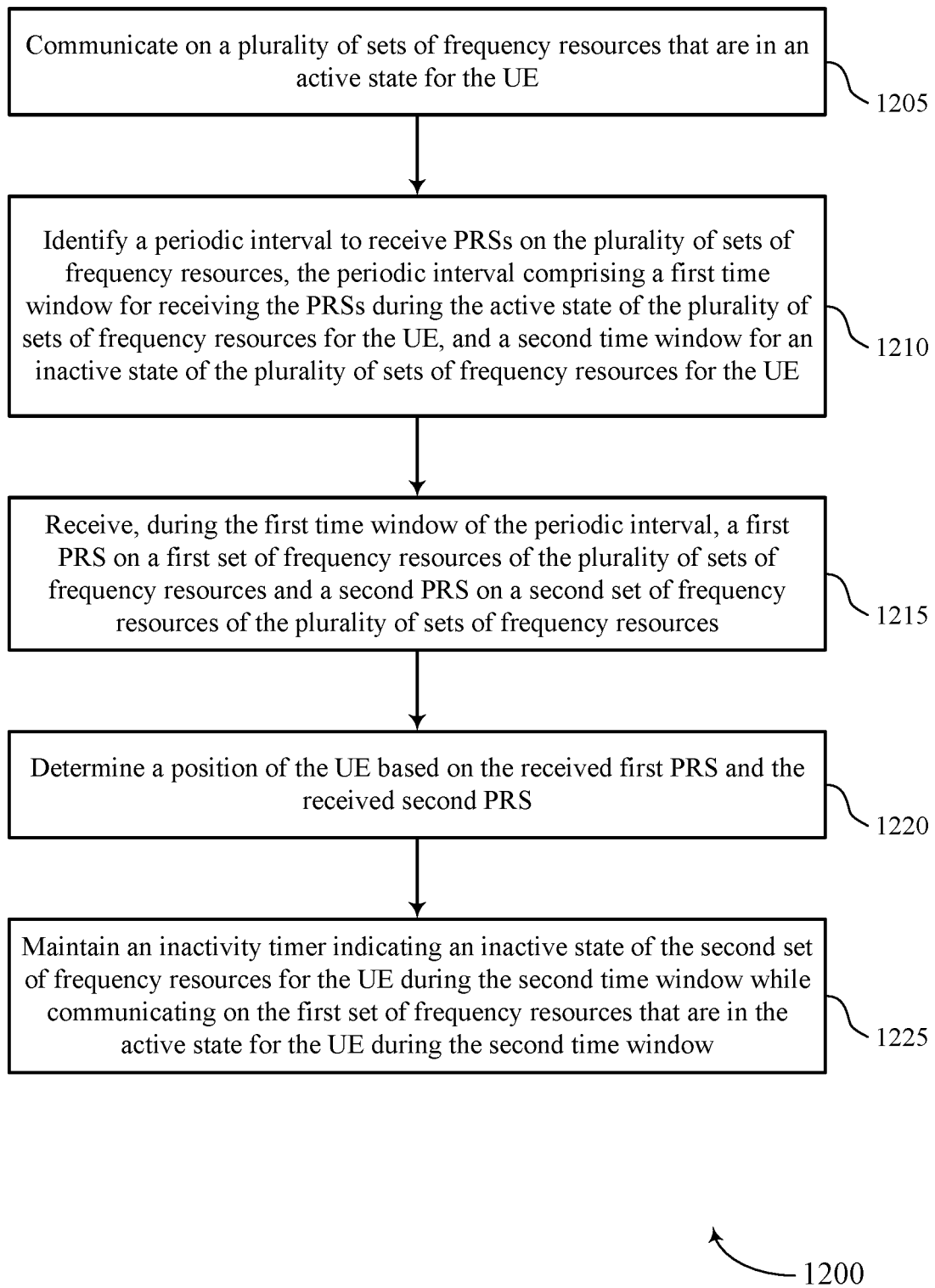

FIG. 12 shows a flowchart illustrating a method 1200 that supports interaction of positioning and MAC procedures in accordance with aspects of the present disclosure. The operations of method 1200 may be implemented by a UE 115 or its components as described herein. For example, the operations of method 1200 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1205, the UE may communicate on a plurality of sets of frequency resources that are in an active state for the UE. The operations of 1205 may be performed according to the methods described herein. In some examples, aspects of the operations of 1205 may be performed by an active state communicator as described with reference to FIGS. 6 through 9.

At 1210, the UE may identify a periodic interval to receive PRSs on the plurality of sets of frequency resources, the periodic interval including a first time window for receiving the PRSs during the active state of the plurality of sets of frequency resources for the UE, and a second time window for an inactive state of the plurality of sets of frequency resources for the UE. The operations of 1210 may be performed according to the methods described herein. In some examples, aspects of the operations of 1210 may be performed by a periodic PRS identifier as described with reference to FIGS. 6 through 9.

At 1215, the UE may receive, during the first time window of the periodic interval, a first PRS on a first set of frequency resources of the plurality of sets of frequency resources and a second PRS on a second set of frequency resources of the plurality of sets of frequency resources. The operations of 1215 may be performed according to the methods described herein. In some examples, aspects of the operations of 1215 may be performed by a PRS receiver as described with reference to FIGS. 6 through 9.

At 1220, the UE may determine a position of the UE based on the received first PRS and the received second PRS. The operations of 1220 may be performed according to the methods described herein. In some examples, aspects of the operations of 1220 may be performed by a position determination component as described with reference to FIGS. 6 through 9.

At 1225, the UE may maintain an inactivity timer indicating an inactive state of the second set of frequency resources for the UE during the second time window while communicating on the first set of frequency resources that are in the active state for the UE during the second time window. The operations of 1225 may be performed according to the methods described herein. In some examples, aspects of the operations of 1225 may be performed by an inactivity timer component as described with reference to FIGS. 6 through 9.

Figure 13:
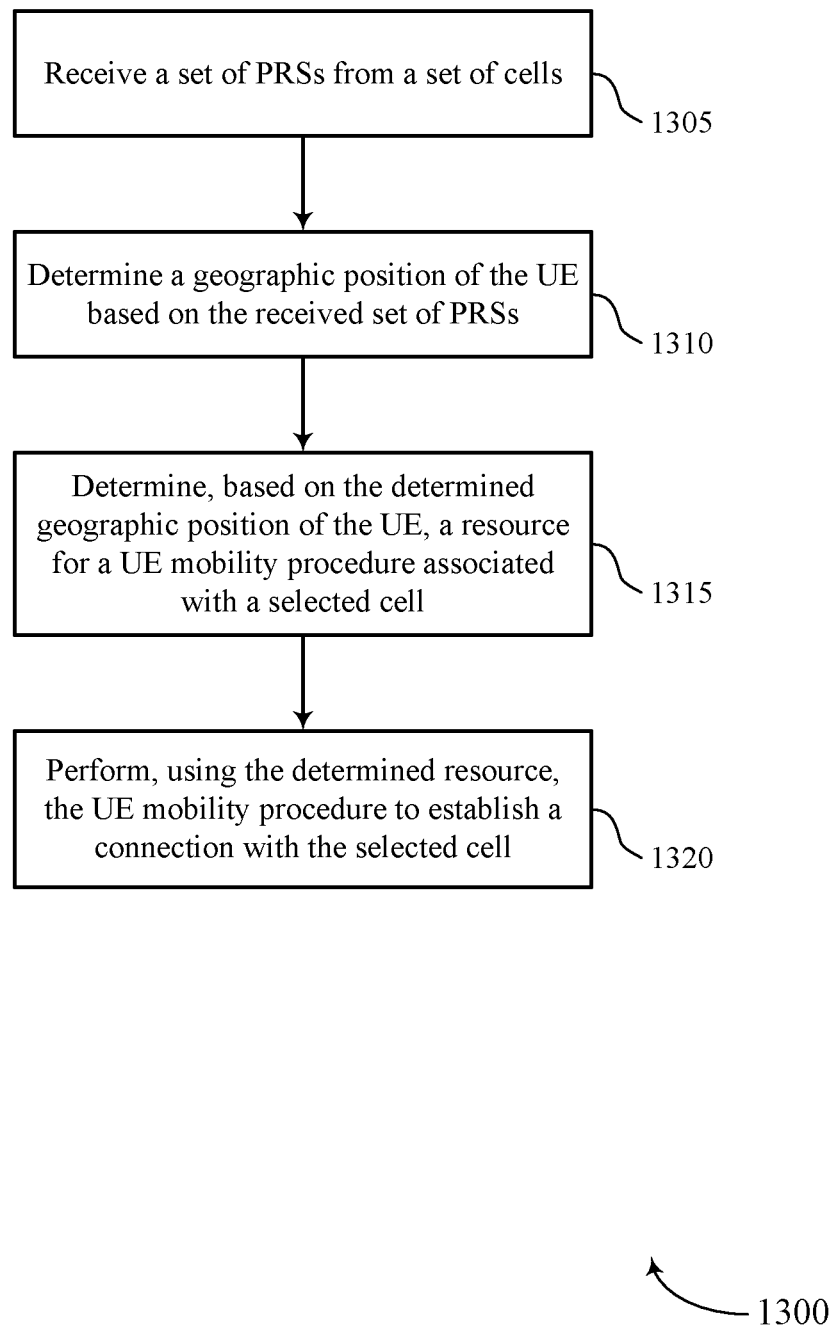

FIG. 13 shows a flowchart illustrating a method 1300 that supports interaction of positioning and MAC procedures in accordance with aspects of the present disclosure. The operations of method 1300 may be implemented by a UE 115 or its components as described herein. For example, the operations of method 1300 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1305, the UE may receive a set of PRSs from a set of cells. The operations of 1305 may be performed according to the methods described herein. In some examples, aspects of the operations of 1305 may be performed by a PRS receiver as described with reference to FIGS. 6 through 9.

At 1310, the UE may determine a geographic position of the UE based on the received set of PRSs. The operations of 1310 may be performed according to the methods described herein. In some examples, aspects of the operations of 1310 may be performed by a position determination component as described with reference to FIGS. 6 through 9.

At 1315, the UE may determine, based on the determined geographic position of the UE, a resource for a UE mobility procedure associated with a selected cell. The operations of 1315 may be performed according to the methods described herein. In some examples, aspects of the operations of 1315 may be performed by a mobility procedure resource component as described with reference to FIGS. 6 through 9.

At 1320, the UE may perform, using the determined resource, the UE mobility procedure to establish a connection with the selected cell. The operations of 1320 may be performed according to the methods described herein. In some examples, aspects of the operations of 1320 may be performed by a mobility procedure component as described with reference to FIGS. 6 through 9.

Figure 14:
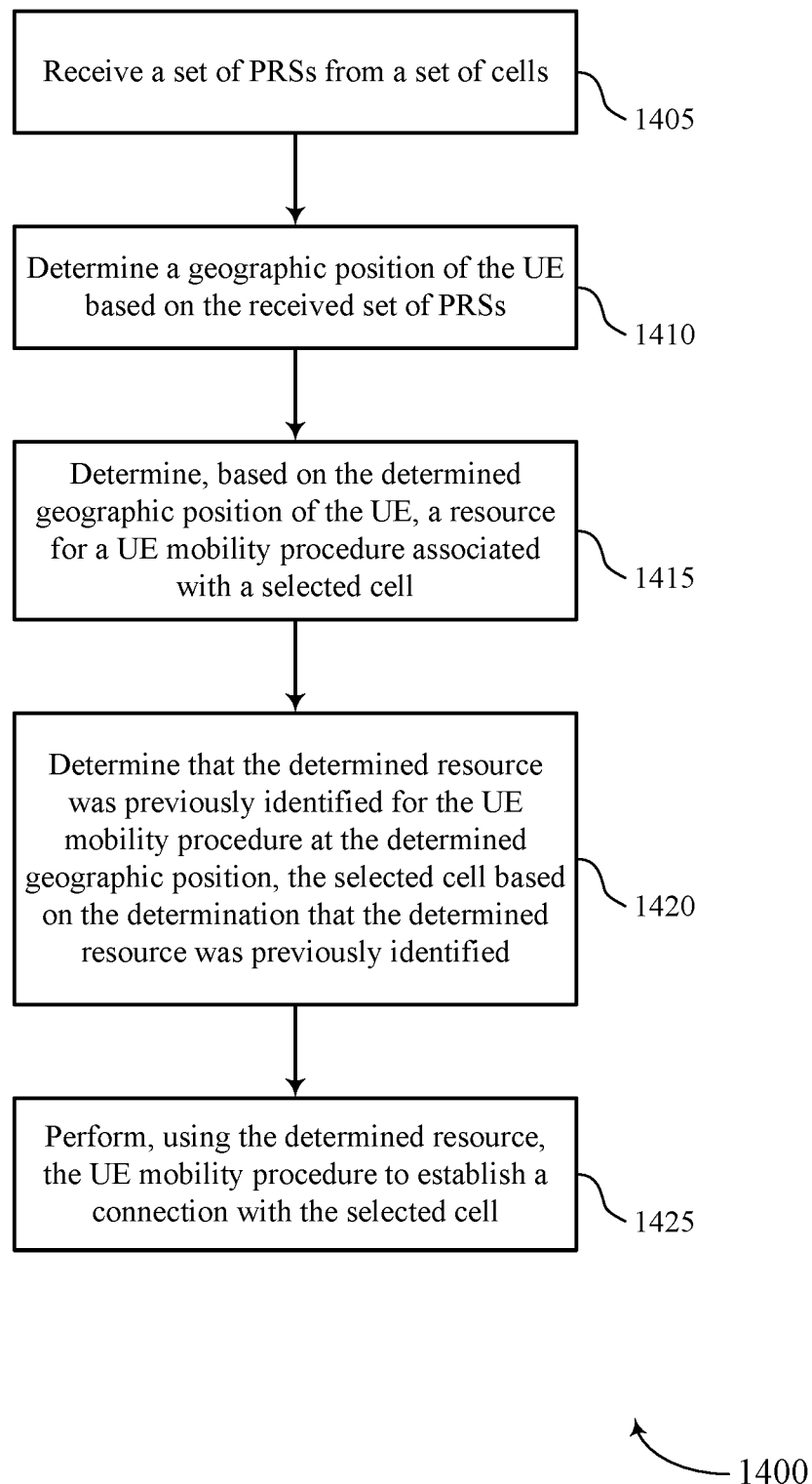

FIG. 14 shows a flowchart illustrating a method 1400 that supports interaction of positioning and MAC procedures in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive a set of PRSs from a set of cells. The operations of 1405 may be performed according to the methods described herein. In some examples, aspects of the operations of 1405 may be performed by a PRS receiver as described with reference to FIGS. 6 through 9.

At 1410, the UE may determine a geographic position of the UE based on the received set of PRSs. The operations of 1410 may be performed according to the methods described herein. In some examples, aspects of the operations of 1410 may be performed by a position determination component as described with reference to FIGS. 6 through 9.

At 1415, the UE may determine, based on the determined geographic position of the UE, a resource for a UE mobility procedure associated with a selected cell. The operations of 1415 may be performed according to the methods described herein. In some examples, aspects of the operations of 1415 may be performed by a mobility procedure resource component as described with reference to FIGS. 6 through 9.

At 1420, the UE may determine that the determined resource was previously identified for the UE mobility procedure at the determined geographic position, the selected cell based on the determination that the determined resource was previously identified. The operations of 1420 may be performed according to the methods described herein. In some examples, aspects of the operations of 1420 may be performed by a mobility procedure resource component as described with reference to FIGS. 6 through 9.

At 1425, the UE may perform, using the determined resource, the UE mobility procedure to establish a connection with the selected cell. The operations of 1425 may be performed according to the methods described herein. In some examples, aspects of the operations of 1425 may be performed by a mobility procedure component as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000 or Universal Terrestrial Radio Access (UTRA). CDMA2000 covers IS-2000, IS-95, and IS-856 standards. IS-2000 Releases may be commonly referred to as CDMA2000 1x or 1x. IS-856 (TIA-856) is commonly referred to as CDMA2000 1xEV-DO or High Rate Packet Data (HRPD). UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20 or Flash-OFDM. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (for example, several kilometers in radius) and may allow unrestricted access by UEs with service subscriptions with the network provider. A small cell may be associated with a lower-powered base station, as compared with a macro cell, and a small cell may operate in the same or different (for example, licensed or unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (for example, a home) and may provide restricted access by UEs having an association with the femto cell (for example, UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (for example, two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at different locations, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (that is, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    communicating on a first set of frequency resources that are in an active state for the UE;
    identifying a periodic interval associated with a second set of frequency resources, wherein the second set of frequency resources are in an inactive state for data communications for the UE, the periodic interval comprising a first time window during which the second set of frequency resources are activated for positioning reference signal monitoring and a second time window during which the second set of frequency resources are inactive for data communications and for positioning reference signal monitoring; and
    receiving, during the first time window of the periodic interval, a first positioning reference signal on the first set of frequency resources and a second positioning reference signal on the second set of frequency resources.

2. The method of claim 1, further comprising receiving a configuration indicating the periodic interval, wherein the periodic interval is identified based on the received configuration.

3. The method of claim 1, further comprising receiving, on the second set of frequency resources, control channel signaling during the first time window.

4. The method of claim 3, wherein the second positioning reference signal and the control channel signaling are received during a same set of one or more symbol periods.

5. The method of claim 3, wherein the second positioning reference signal is received in a first set of one or more symbol periods and the control channel signaling is received in a second set of one or more symbol periods adjacent to the first set of one or more symbol periods.

6. The method of claim 1, wherein communicating on the first set of frequency resources comprises communicating on the first set of frequency resources based on a configuration that includes the first set of frequency resources, and excludes the second set of frequency resources.

7. The method of claim 1, wherein:
    the first set of frequency resources comprise a first component carrier; and
    the second set of frequency resources comprise a second component carrier different than the first component carrier.

8. The method of claim 1, wherein:
the first set of frequency resources comprise a first bandwidth part; and
the second set of frequency resources comprise a second bandwidth part different than the first bandwidth part.

9. The method of claim 1, further comprising maintaining an inactivity timer indicating the inactive state of the second set of frequency resources for the UE during the second time window while communicating on the first set of frequency resources that are in the active state for the UE during the second time window.

10. The method of claim 1, wherein receiving the first positioning reference signal and the second positioning reference signal comprises receiving, during the first time window of the periodic interval, the first positioning reference signal from a first network device on the first set of frequency resources and the second positioning reference signal from a second network device on the second set of frequency resources.

11. The method of claim 1, wherein receiving the first positioning reference signal and the second positioning reference signal comprises receiving, during the first time window of the periodic interval, the first positioning reference signal from a network device on the first set of frequency resources and the second positioning reference signal from the network device on the second set of frequency resources.

12. An apparatus for wireless communication at a user equipment (UE), comprising:
a processor,
memory in electronic communication with the processor; and
instructions stored in the memory and executable by the processor to cause the apparatus to:
communicate on a first set of frequency resources that are in an active state for the UE;
identify a periodic interval associated with a second set of frequency resources, wherein the second set of frequency resources are in an inactive state for data communications for the UE, the periodic interval comprising a first time window during which the second set of frequency resources are activated for positioning reference signal monitoring and a second time window during which the second set of frequency resources are inactive for data communications and for positioning reference signal monitoring; and
receive, during the first time window of the periodic interval, a first positioning reference signal on the first set of frequency resources and a second positioning reference signal on the second set of frequency resources.

13. The apparatus of claim 12, wherein the instructions are further executable by the processor to cause the apparatus to receive a configuration indicating the periodic interval, wherein the periodic interval is identified based on the received configuration.

14. The apparatus of claim 12, wherein the instructions are further executable by the processor to cause the apparatus to receive, on the second set of frequency resources, control channel signaling during the first time window.

15. The apparatus of claim 14, wherein the second positioning reference signal and the control channel signaling are received during a same set of one or more symbol periods.

16. The apparatus of claim 14, wherein the second positioning reference signal is received in a first set of one or more symbol periods and the control channel signaling is received in a second set of one or more symbol periods adjacent to the first set of one or more symbol periods.

17. The apparatus of claim 12, wherein the instructions to communicate on the first set of frequency resources are executable by the processor to cause the apparatus to communicate on the first set of frequency resources based on a configuration that includes the first set of frequency resources and excludes the second set of frequency resources.

18. The apparatus of claim 12, wherein:
the first set of frequency resources comprise a first component carrier; and
the second set of frequency resources comprise a second component carrier different than the first component carrier.

19. The apparatus of claim 12, wherein:
the first set of frequency resources comprise a first bandwidth part; and
the second set of frequency resources comprise a second bandwidth part different than the first bandwidth part.

20. The apparatus of claim 12, wherein the instructions are further executable by the processor to cause the apparatus to maintain an inactivity timer indicating the inactive state of the second set of frequency resources for the UE during the second time window while communicating on the first set of frequency resources that are in the active state for the UE during the second time window.

21. The apparatus of claim 12, wherein the instructions to receive the first positioning reference signal and the second positioning reference signal are executable by the processor to cause the apparatus to receive, during the first time window of the periodic interval, the first positioning reference signal from a first network device on the first set of frequency resources and the second positioning reference signal from a second network device on the second set of frequency resources.

22. The apparatus of claim 12, wherein the instructions to receive the first positioning reference signal and the second positioning reference signal are executable by the processor to cause the apparatus to receive, during the first time window of the periodic interval, the first positioning reference signal from a network device on the first set of frequency resources and the second positioning reference signal from the network device on the second set of frequency resources.

23. An apparatus for wireless communication at a user equipment (UE), comprising:
means for communicating on a first set of frequency resources that are in an active state for the UE;
means for identifying a periodic interval associated with a second set of frequency resources, wherein the second set of frequency resources are in an inactive state for data communications for the UE, the periodic interval comprising a first time window during which the second set of frequency resources are activated for positioning reference signal monitoring and a second time window during which the second set of frequency resources are inactive for data communications and for positioning reference signal monitoring; and means for receiving, during the first time window of the periodic interval, a first positioning reference signal on the first set of frequency resources and a second positioning reference signal on the second set of frequency resources.

24. The apparatus of claim 23, further comprising means for receiving a configuration indicating the periodic interval, wherein the periodic interval is identified based on the received configuration.

25. The apparatus of claim 23, further comprising means for receiving, on the second set of frequency resources, control channel signaling during the first time window.

26. The apparatus of claim 23, wherein the means for communicating on the first set of frequency resources are based on a configuration that includes the first set of frequency resources, and excludes the second set of frequency resources.

27. The apparatus of claim 23, further comprising means for maintaining an inactivity timer indicating the inactive state of the second set of frequency resources for the UE during the second time window while communicating on the first set of frequency resources that are in the active state for the UE during the second time window.

28. The apparatus of claim 23, wherein the means for receiving the first positioning reference signal and the second positioning reference signal comprise means for receiving, during the first time window of the periodic interval, the first positioning reference signal from a first network device on the first set of frequency resources and the second positioning reference signal from a second network device on the second set of frequency resources.

29. The apparatus of claim 23, wherein the means for receiving the first positioning reference signal and the second positioning reference signal comprise means for receiving, during the first time window of the periodic interval, the first positioning reference signal from a network device on the first set of frequency resources and the second positioning reference signal from the network device the second set of frequency resources.

30. A non-transitory computer-readable medium storing code for wireless communication at a user equipment (UE), the code comprising instructions executable by a processor to:
communicate on a first set of frequency resources that are in an active state for the UE;
identify a periodic interval associated with a second set of frequency resources, wherein the second set of frequency resources are in an inactive state for data communications for the UE, the periodic interval comprising a first time window during which the second set of frequency resources are activated for positioning reference signal monitoring and a second time window during which the second set of frequency resources are inactive for data communications and for positioning reference signal monitoring; and
receive, during the first time window of the periodic interval, a first positioning reference signal on the first set of frequency resources and a second positioning reference signal on the second set of frequency resources.

31. The method of claim 1, further comprising:
determining a position of the UE based at least in part on the received first positioning reference signal and the received second positioning reference signal.

32. The apparatus of claim 12, wherein the instructions are further executable by the processor to cause the apparatus to determine a position of the UE based at least in part on the received first positioning reference signal and the received second positioning reference signal.

33. The apparatus of claim 23, further comprising means for determining a position of the UE based at least in part on the received first positioning reference signal and the received second positioning reference signal.

34. The non-transitory computer-readable medium of claim 30, wherein the code further comprises instructions executable by the processor to:
determine a position of the UE based at least in part on the received first positioning reference signal and the received second positioning reference signal.

* * * * *